(12) United States Patent
Inubushi et al.

(10) Patent No.: US 8,088,008 B2
(45) Date of Patent: Jan. 3, 2012

(54) GAME SYSTEM

(75) Inventors: Takashi Inubushi, Tokyo (JP);
Yoshihiko Narita, Tokyo (JP);
Yoshinobu Morimoto, Tokyo (JP)

(73) Assignee: Konami Digital Entertainment Co., Ltd, Tokyo (JP)

( * ) Notice: Subject to any disclaimer, the term of this patent is extended or adjusted under 35 U.S.C. 154(b) by 942 days.

(21) Appl. No.: 11/914,726

(22) PCT Filed: Mar. 30, 2006

(86) PCT No.: PCT/JP2006/306640
§ 371 (c)(1),
(2), (4) Date: Nov. 16, 2007

(87) PCT Pub. No.: WO2006/123477
PCT Pub. Date: Nov. 23, 2006

(65) Prior Publication Data
US 2009/0062009 A1    Mar. 5, 2009

(30) Foreign Application Priority Data

May 20, 2005   (JP) ................................ 2005-148424

(51) Int. Cl.
*A63F 13/00*   (2006.01)
(52) U.S. Cl. .......................................... 463/42; 725/133
(58) Field of Classification Search .................. 463/42;
348/739; 315/291–292; 709/230, 26.5; 725/133
See application file for complete search history.

(56) References Cited

U.S. PATENT DOCUMENTS 6,168,524 B1 *   1/2001   Aoki et al. ..................... 463/31
6,758,746 B1 *   7/2004   Hunter et al. ................... 463/9
2002/0160824 A1   10/2002   Goto et al.
2003/0186744 A1   10/2003   Bradell
2004/0143852 A1   7/2004    Meyers
2004/0242294 A1   12/2004   Shiozawa
2005/0043094 A1   2/2005    Nguyen et al.

FOREIGN PATENT DOCUMENTS

| EP | 1 700 626 A1 | 9/2006 |
| JP | 11-114217 A | 4/1999 |
| JP | 2002-239207 A | 8/2002 |

(Continued)

OTHER PUBLICATIONS

"Battle Climax", Monthly Acradia Magazine, June (SerialNo. 49), Japan, Enterbrain Inc., Jun. 1, 2004, vol. 5, No. 6 (Serial No. 49), pp. 24-31.
Extended European Search Report dated Nov. 13, 2008.
"Everquest Game MMORPG" Internet Citation, [Online] XP002263086, URL:http//everquest.station.sonycom/about.jsp> [retrieved on Nov. 6, 2003.

(Continued)

*Primary Examiner* — Masud Ahmed
(74) *Attorney, Agent, or Firm* — Sughrue Mion, PLLC

(57) ABSTRACT

A game device (A1) registers at least one game character from among a plurality of prepared game characters with an entity managed in a virtual space by a player, and engages in a competition with another game device (B1), using a game character that is specified by a player from among registered game characters. A server device (3) computes a degree of popularity for each of game character on the basis of information sent from a plurality of game devices (A1, B1), and determines registration fees necessary for registering game characters with players' entities on the basis of degrees of popularity. The registration fee list is delivered to each game device when the game device is activated.

12 Claims, 12 Drawing Sheets

FOREIGN PATENT DOCUMENTS

| | | |
|---|---|---|
| JP | 2004-275231 A | 10/2004 |
| JP | 2005-168744 A | 6/2005 |
| TW | 557225 | 10/2003 |
| TW | M254250 | 1/2005 |
| WO | 2005028052 A2 | 3/2005 |

OTHER PUBLICATIONS

Canadian Office Action corresponding to Canadian Patent Application No. 2,616,484, dated Jul. 13, 2011.

* cited by examiner

| WRESTLER ID | REGISTRATION FEE |
|---|---|
| 0001 | 1,000,000 |
| 0002 | 3,500,000 |
| 0003 | 2,000,000 |
| ⋮ | ⋮ |

FIG. 14

| WRESTLER ID | THE NUMBER OF INDIVIDUAL WRESTLER REGISTRATIONS |
|---|---|
| 0001 | P1 |
| 0002 | P2 |
| 0003 | P3 |
| ⋮ | ⋮ |
| 0100 | P100 |

FIG. 15

TBL2

| WRESTLER ID | THE NUMBER OF MATCHES THE WRESTLER ENTERED | | | | |
| | 1 DAY EARLIER | 2 DAYS EARLIER | 3 DAYS EARLIER | ... | 35 DAYS EARLIER |
|---|---|---|---|---|---|
| 0001 | 10 | 15 | 38 | ... | 3 |
| 0002 | 27 | 55 | 30 | ... | 30 |
| 0003 | 300 | 240 | 170 | ... | 800 |
| ⋮ | ⋮ | ⋮ | ⋮ | ⋮ | ⋮ |
| 0100 | 7 | 30 | 60 | ... | 29 | ns
GAME SYSTEM

TECHNICAL FIELD

The present invention relates to game systems.

BACKGROUND ART

Network-type game systems, in each of which a server controls operations of a plurality of game devices connected via a network, have been widely used. In a game realized by such a game system, a professional wrestler, registered with an entity managed by a player who operates a game device, plays a match against another professional wrestler registered with another entity managed by another player who operates another game device, as described in "Battle Climax", Monthly Arcadia Magazine, June (Serial No. 49), Japan, Enterbrain Inc., Jun. 1, 2004, Vol. 5, No. 6 (Serial No. 49), pp. 24-31.

This game system uses wrestler cards for executing games. On a wrestler card, information is recorded about a wrestler as a character (game character) that will be used in games. A wrestler card is necessary for a player to register the wrestler recorded on the wrestler card with an entity of the player by operating a game device. Accordingly, if a player has more various types of wrestler cards, the player can select preferred wrestlers from among various wrestlers and register the wrestler with the player's entity, and therefore a greater diversity of choices is available. By virtue of this worth, wrestler cards are regarded as collectibles. The game system provider has been preparing several hundred wrestler cards. The wrestler cards can be treated as trading cards that can be exchanged among players. This feature is an important factor for enriching a fascinating aspect of games.

DISCLOSURE OF THE INVENTION

In a game in this game system, each player designates a wrestler from among a plurality of wrestlers registered with the player's entity, and then the designated wrestlers play a match against each other. When a player registers the wrestler recorded on a wrestler card with the player's entity, the same wrester can already have been registered with one or more entities managed by other players since a plurality of players can take possession of the same type of wrestler card. In particular, each popular wrestler will be registered multiple times with a plurality of entities managed by different players. Therefore, it is possible that a wrestler will play a match against the same wrestler.

However, a match between different wrestlers is more interesting than a match between wrestlers with the same characteristics. The original purpose of providing variable wrestler cards is to give players a greater diversity of choices and to provide a wide variety of matchups. In a conventional game system, the registration ratio of wrestlers is very biased, and therefore there is a high probability that wrestlers with the same characteristics will play a match against each other.

Accordingly, it is an object of the present invention to provide a game system in which each player uses game characters registered with the player's entity for playing games, and in which usage ratios of game characters are not significantly biased.

In the following, a description will be given of the present invention. It should be noted that reference numerals in the attached drawings are shown in parenthesis to facilitate understanding of the present invention, and not to limit the present invention to embodiments as shown in the drawings.

In order to solve the above-described problem, a game system (100) according to the present invention includes a server device (3) and a plurality of game devices (A1, B1) communicable with the server device, in which each of the game devices registers at least one game character from among a plurality of prepared game characters with an entity managed in a virtual space by a player, engages in a competition with another of the game devices, using a game character that is specified by a player from among said at least one registered game character, and computes based on details of a competition an amount of a virtual fund possessed by an entity. The server device (3) includes: an individual information memory part (TBL1) that stores an identifier identifying a player and an individual information set including character information specifying at least one game character registered by the player with an entity that the player manages and fund information indicating an amount of a virtual fund possessed by the entity, the identifier and the individual information set being stored in association with each other; an individual information acquisition replier (300, 304) that, upon receiving from one of the game devices (A1, B1) an individual information acquisition request containing an identifier of a player, acquires from the individual information memory part (TBL1) an individual information set corresponding to the received identifier, and transmits to the game device (A1, B1) having transmitted the individual information acquisition request an individual information acquisition response containing the acquired individual information set; an individual information updater (300) that, upon receiving from one of the game devices (A1, B1) an individual information update request containing an identifier and an updated individual information set, updates an individual information set stored in association with the received identifier in the individual information memory part (TBL1) by replacing the stored individual information set with the updated individual information set; a degree of popularity computer (300, S300-S302) that computes a degree of popularity for each of the prepared game characters, the degree of popularity relating to the number of entities with which each game character is registered, the computation being performed by referring to contents stored in the individual information memory part (TBL1); a registration fee determiner (300, S303) that generates, based on the degree of popularity computed by the degree of popularity computer (300, S300-S302), registration fee information for each of the prepared game characters, the registration fee information indicating a registration fee in virtual money necessary for registering each game character with an entity; and a registration fee information deliverer (300, 304) that delivers to the game devices (A1, B1) registration fee information for each game character determined by the registration fee determiner (300, S303). Each of the game devices (A1, B1) includes: a first reader (270) that reads, from a first information recording medium (30) storing an identifier identifying a player, the identifier; a second reader (250) that reads, from a second information recording medium (31) storing character information specifying a game character, the character information; an input unit (23a-23d) that receives an input instruction from a player; a first storage device (201) that stores registration fee information for each of the prepared game characters received from the server device (3); an individual information acquisition requester (200, S20, S30) that transmits, before a game, to the server device (3) an individual information acquisition request containing the identifier and requesting for an individual information set corresponding to the identifier, the individual information acquisition requester receiving from the server device (3) an individual information acquisition response containing the individual information set; a second storage device (201) that stores the individual information set received by the individual information acquisition requester (200, S20, S30); a first updater (200, S90) that updates, after finishing a game, based on details of the game, fund information of the individual information set stored in the second storage device (201); a comparer (200, S205) that, upon reading the character information by the second reader (250), reads from the first storage device (201) registration fee information for the game character corresponding to the character information read by the second reader, and compares a current amount of the virtual fund indicated by the fund information to a registration fee indicated by the registration fee information for the game character; a registration permitter (200) that permits registration of the game character to an entity managed by a player identified by the identifier in a case in which a result of the comparison by the comparer (200, S205) shows that the current amount of the virtual fund is equal to or greater than the registration fee; a second updater (200, S208) that, upon permission of registration of the game character by the registration permitter (200), obtains new fund information by deducting the registration fee for the game character from the current amount of the virtual fund, and updates the individual information set stored in the second storage device (201) so as to contain the new fund information and the character information of the registered game character; and an individual information update requester (200, S120) that generates, upon updating the individual information set by at least one of the first and second updaters, an individual information update request containing the updated individual information set and the identifier, the individual information update requester transmitting the individual information update request to the server device (3).

In a game in which the present invention is applied, game characters available for competitions by a player are limited to game characters registered with the player's entity. However, if a player pays a registration fee (fee necessary for players to newly employ a game character for playing the game) of a game character, the game character may be registered with the player's entity, so that a plurality of players may register the same game character with the players' entities. When the number of game characters that can be registered with one entity is limited, popular game characters may be exclusively registered in comparison with a case in which the number of registrable game character is not limited. If the same game character is registered with a plurality of entities, game characters of the same characteristics play a match with each other, but this is not interesting in comparison with a matchup between different game characters. According to the present invention, registration fees are changed depending on the degrees of popularity of game characters. Registration fees will be raised for game characters having a higher degree of popularity, whereas registration fees will be lowered for game characters having a lower degree of popularity. Therefore, convergence of registrations of some of the game characters can be prevented, and various game characters can be registered with different entities. Accordingly, the worth of each second information recording medium (the wrestler cards in the embodiments) storing character information, which is conventionally fixed, can be changed, so that the amusement factor can be broadly improved in the overall game system.

Virtual money in the present application is a standard of value of exchange that is effective within this game. Paying a registration fee from a player's virtual fund allows the player's entity to register a game character. Players who participate in the game are expected to compete in virtual box-office income and current total fund (new fund) through the game. However, players may compete in other kinds of privileges (for example, points, titles, or privileged orbs) that players may obtain. Virtual funds may be used to obtain such privileges. Obtained privileges may be exchanged for game elements (for example, game characters). If obtained privileges may be exchanged for game elements, the privileges may be included in virtual money since they are standards of value of exchange.

In the game system, preferably, the registration fee determiner (300, S303) executes a first process of computing a deviation of a degree of popularity for each prepared game character from an average degree of popularity of the plurality of prepared game characters and a second process of determining the registration fee for each prepared game character by increasing or decreasing a value of a standard registration fee by a value corresponding to the deviation. In this case, registration fees can be determined by increasing or decreasing a value of a standard registration fee, depending on degree of popularity. The value of the standard may be common to a plurality of game characters or may be individually determined for each game character. For example, when offensive capability and defensive capability differ depending on an individual game character, it is preferable to determine the value of the standard individually for each game character. Registration fees will be set higher for capable game characters for impeding registration, so that it is possible to enhance the rarity value of the second information recording medium storing the character information indicating such a game character.

Furthermore, in the game system, it is preferable that each game device (A1, B1) further include a dispensing mechanism (280) for dispensing a new second information recording medium (31) when a game has been finished. In the second process, the registration fee determiner (300, S303) determines the registration fee for at least a part (part or all) of the prepared game characters by increasing or decreasing a value of a standard registration fee on the basis of the deviation and an incidence probability of each game character showing a probability that a game character indicated by the game character information recorded on the new second information recording medium (31) dispensed from the dispensing mechanism (280) is the corresponding game character. Registration of a game character with a player's entity requires obtaining a second information recording medium by the player. Second information recording media are dispensed from a game device when games are finished. On a second information recording medium, character information indicating a game character uniquely is stored. A plurality of game characters on second information recording media have different incidence probabilities. The incidence probability is the ratio of the number of issued second information recording medium of a type of game character to the total number of all second information recording media issued by the game provider. In other words, the incidence probability of each game character is a probability that a second information recording medium dispensed from the dispensing mechanism at the finish of a game is the second information recording medium recording the corresponding type of game character. A game character with a lower incidence probability among the second information recording media has a lower probability of being registered. On the other hand, a game character with a higher incidence probability has a higher probability of being registered. If the registration fee of a game character having a lower incidence probability is expensive, the probability of the game character being registered will be reduced more, so that the registration fee of the game character will be more expensive. By referring to not only degrees of popularity but also incidence probabilities, registration fees are determined in a coordinated way.

Another game system (100) according to the present invention includes a server device (3) and a plurality of game devices (A1, B1) communicable with the server device, in which each of the game devices registers at least one game character from among a plurality of prepared game characters with an entity managed in a virtual space by a player, engages in a competition with another of the game devices, using a game character that is specified by a player from among said at least one registered game character, and computes based on details of a competition an amount of a virtual fund possessed by an entity. The server device (3) includes: an individual information memory part (TBL1) that stores an identifier identifying a player and an individual information set including character information specifying at least one game character registered by the player with an entity that the player manages and fund information indicating an amount of a virtual fund possessed by the entity, the identifier and the individual information set being stored in association with each other; an individual information acquisition replier (300, 304) that, upon receiving from one of the game devices (A1, B1) an individual information acquisition request containing an identifier of a player, acquires from the individual information memory part (TBL1) an individual information set corresponding to the received identifier, and transmits to the game device (A1, B1) having transmitted the individual information acquisition request an individual information acquisition response containing the acquired individual information set; an individual information updater (300) that, upon receiving from one of the game devices (A1, B1) an individual information update request containing an identifier and an updated individual information set, updates an individual information set stored in association with the received identifier in the individual information memory part (TBL1) by replacing the stored individual information set with the updated individual information set; a usage ratio computer (300) that computes, for each of the prepared game characters, a usage ratio indicating frequency of each game character having been used for competitions, based on specific information received from the game devices, the specific information specifying a game character used in a competition at each game device; a registration fee determiner (300, S303) that generates, based on the usage ratio computed by the usage ratio computer (300), registration fee information for each of the prepared game characters, the registration fee information indicating a registration fee in imaginary money necessary for registering each game character with an entity; and a registration fee information deliverer (300, 304) that delivers to the game devices (A1, B1) registration fee information for each game character determined by the registration fee determiner (300, S303). Each of the game devices includes: a first reader (270) that reads, from a first information recording medium (30) storing an identifier identifying a player, the identifier; a second reader (250) that reads, from a second information recording medium (31) storing character information specifying a game character, the character information; an input unit (23a-23d) that receives an input instruction from a player; a first storage device (201) that stores registration fee information for each of the prepared game characters received from the server device (3); an individual information acquisition requester (200, S20, S30) that transmits, before a game, to the server device (3) an individual information acquisition request containing the identifier and requesting for an individual information set corresponding to the identifier, the individual information acquisition requester receiving from the server device (3) an individual information acquisition response containing the individual information set; a second storage device (201) that stores the individual information set received by the individual information acquisition requester (200, S20, S30); a first updater (200, S90) that updates, after finishing a game, based on details of the game, fund information of the individual information set stored in the second storage device (201); a comparer (200, S205) that, upon reading the character information by the second reader (250), reads from the first storage device (201) registration fee information for the game character corresponding to the character information read by the second reader (250), and compares a current amount of the virtual fund indicated by the fund information to a registration fee indicated by the registration fee information for the game character; a registration permitter (200) that permits registration of the game character to an entity managed by a player identified by the identifier in a case in which a result of the comparison by the comparer (200, S205) shows that the current amount of the virtual fund is equal to or greater than the registration fee; a second updater (200, S208) that, upon permission of registration of the game character by the registration permitter, obtains new fund information by deducting the registration fee for the game character from the current amount of the virtual fund, and updates the individual information set stored in the second storage device (201) so as to contain the new fund information and the character information of the registered game character; a specific information generator (200) that generates specific information specifying a game character used in a competition at the game device; an individual information update requester (200, S120) that generates, upon updating the individual information set by at least one of the first and second updaters, an individual information update request containing the updated individual information set and the identifier, the individual information update requester transmitting the individual information update request to the server device (3); and a specific information transmitter (200) that transmits the specific information generated by the specific information generator to the server device.

In accordance with the present invention, registration fees are changed depending on usage ratios of game characters used in competitions. Registration fees will be raised for game characters having a higher usage ratio while registration fees will be lowered for game characters having a lower usage ratio. Therefore, convergence of registrations of a part of game characters can be prevented, and various game characters can be registered with different entities. Accordingly, the worth of each second information recording medium (wrestler card in the embodiments) storing character information, which is conventionally fixed, can be changed, so that the amusement factor can be broadly improved in the overall game system.

In the game system, preferably, the registration fee determiner (300, S303) executes a first process of computing a deviation of a usage ratio for each prepared game character from an average usage ratio of the plurality of prepared game characters and a second process of determining the registration fee for each prepared game character by increasing or decreasing a value of a standard registration fee by a value corresponding to the deviation. In this case, registration fees can be determined by increasing or decreasing a value of a standard registration fee depending on usage ratios. The value of standard may be common to a plurality of game characters or may be individually determined for each game character. For example, when offensive capability and defensive capability differ depending on an individual game character, it is preferable to determine the value of the standard individually for each game character. Registration fees will be set higher for capable game characters to impede registration, so that it is possible to enhance the rarity value of the second information recording medium storing the character information indicating such a game character.

Furthermore, in the game system, it is preferable that each game device (A1, B1) further include a dispensing mechanism (280) for dispensing a new second information recording medium (31) when a game has been finished. In the second process, the registration fee determiner (300, S303) determines the registration fee for at least a part (part or all) of the prepared game characters by increasing or decreasing a value of a standard registration fee on the basis of the deviation and an incidence probability of each game character showing a probability that a game character indicated by the game character information recorded on the new second information recording medium (31) dispensed from the dispensing mechanism (280) is the corresponding game character. Registration of a game character with a player's entity requires obtaining a second information recording medium by the player. Second information recording media are dispensed from a game device when games are finished. On second information recording medium, character information indicating a game character uniquely is stored. A game character with a lower incidence probability among the second information recording media has a lower probability of being registered. On the other hand, a game character with a higher incidence probability has a higher probability of being registered. If the registration fee of a game character having a lower incidence probability is expensive, the probability of the game character being registered will be reduced more, so that the registration fee of the game character will be more expensive. By referring to not only usage ratios but also incidence probabilities, registration fees are determined in a coordinated manner.

In the game system, preferably each game device (A1, B1) further includes a delivery requester (200) that generates, at the time of each game device being activated, a registration fee information delivery request requesting for delivery of the registration fee information, and that transmits to the server device (3) the registration fee information delivery request. Preferably, the registration fee information deliverer (300, 304) of the server device, upon receiving a registration fee information delivery request from one of the game devices, transmits the registration fee information to the game device (A1, B1) that has transmitted the registration fee information delivery request. A player will want to know the registration fee of a game character for registering the game character with the player's entity. In the present invention, registration fees, which are determined by the server device, change. In each game device that queries the server device about the registration fee of a game character whenever players want to conduct registration, there will be a large number of times of communication, resulting in increase in the workload for the server device. However, in the present invention, each game device receives the registration fee information of a plurality of game characters in a group when the game device is activated, so that communication resources are conserved and the workload for the server device is reduced. Furthermore, each game device receives the registration fee information at the time of activation thereof, and the reception will be completed before players start games, thereby preventing concentration of the workload for each game device.

Effects of the Invention

According to the present invention, there is provided a game system in which each player uses game characters registered with the player's entity for playing games, and in which popularity degrees or usage ratios of game characters are not significantly biased.

BRIEF DESCRIPTION OF THE DRAWINGS

FIG. 14 is a schematic diagram showing examples of numbers of individual wrestler registrations counted for wrestler IDs, respectively in the server device in FIG. 4;

FIG. 15 is a schematic diagram showing contents of a management table TBL2 stored in a server device according to a second embodiment of the present invention.

BEST MODE FOR CARRYING OUT THE INVENTION

First Embodiment

Figure 1:
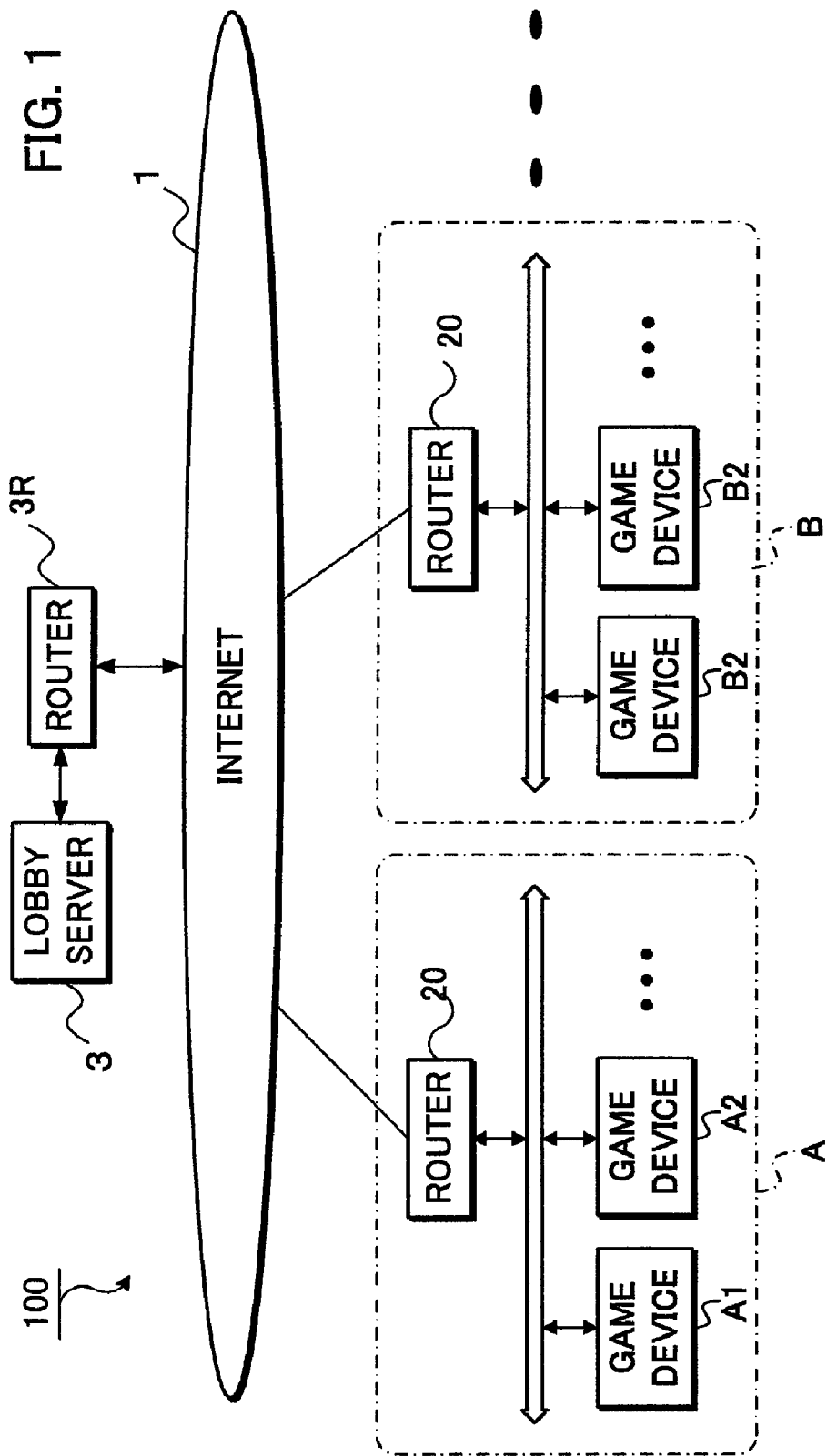
FIG. 1 is a block diagram showing a structure of the game system according to an embodiment of the present invention.

FIG. 1 shows an overall structure of the game system 100 according to an embodiment of the present invention. In the game system 100, a server device 3 is connected with a communication network, e.g., the Internet 1, via a router 3R. A plurality of routers 20, 20, . . . located in a plurality of game arcades A, B, . . . , respectively, are connected with the Internet 1. A plurality of game devices A1, A2, . . . and B1, B2, . . . are located in the game arcades A, B, . . . . Each game device can communicate with the server device 3 and other game devices via the router 20.

Each game device executes operations for a professional wrestling game. This professional wrestling game is designed so that individual players manage and possibly develop their own virtual entities. Each virtual entity is operated by means of an individual management fund therefor. The individual management fund for each entity increases when the entity gains an income by holding a show. In a show, at least one virtual wrestler belonging to an entity battles against another virtual wrestler belonging to another entity in an arena. Therefore, each player should register one or more wrestlers with the player's own entity in advance. This registration needs a registration fee. In addition, a rental fee is necessary for each player's entity to rent an arena. These fees constitute a payout of such an entity, so that the amount of the management fund of the entity decreases depending on the entity's payout. However, it is not permissible for the amount of the management fund of any entity to become negative. Accordingly, an amusement factor of this game is earning a higher box-office income through management of an entity with a limited management fund. It should be noted, in this specification, that "money" such as "funds" and "fees" means virtual money that is a standard of value of exchange that is effective only in a virtual world, i.e., virtual space within this game, and is actually a numeric value represented in data stored in the game system, as will be described later, except for coins which players will deposit into a game device.

Figure 2:
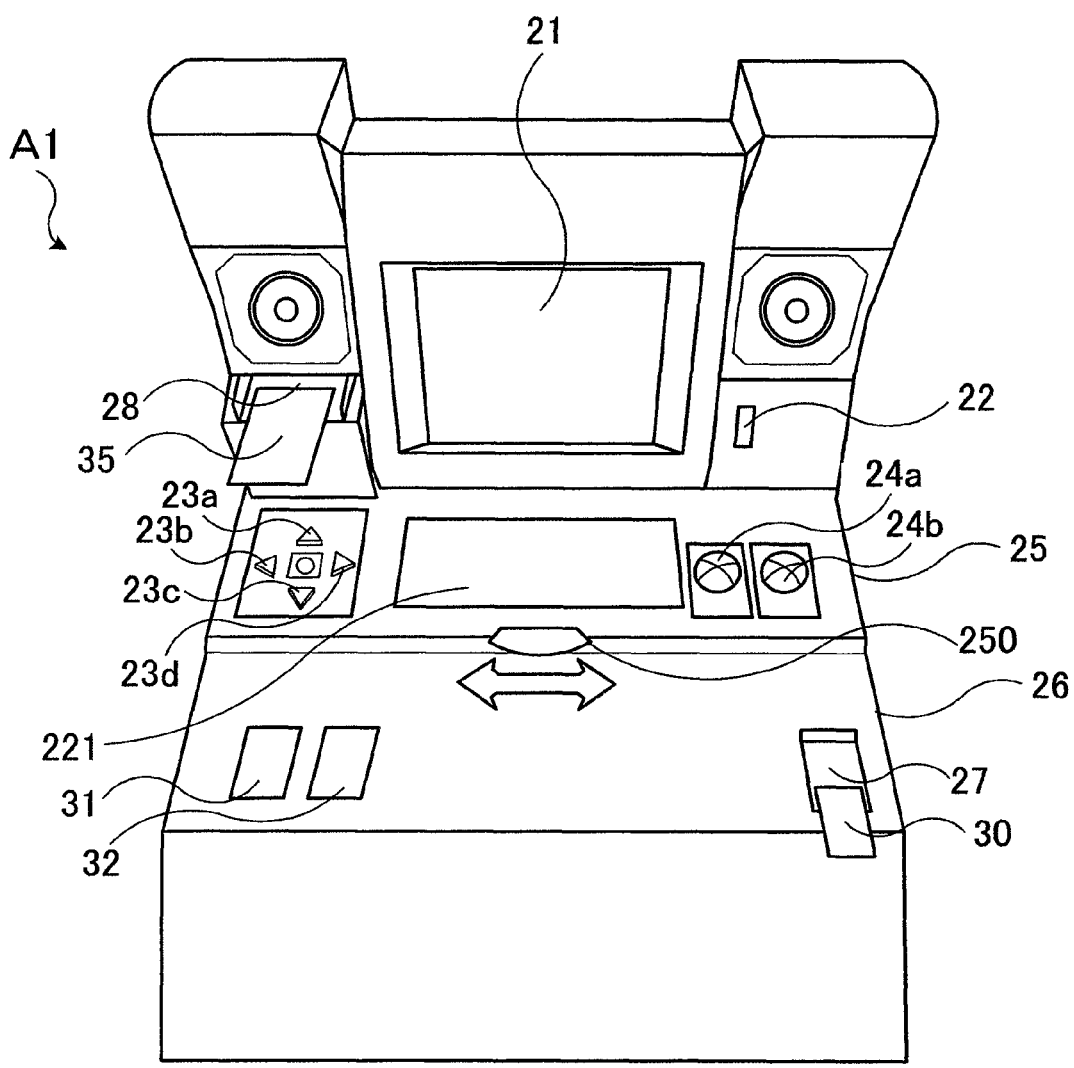
FIG. 2 is a perspective view showing a game device within the game system in FIG. 1.

FIG. 2 shows the appearance of the game device A1. Each of the other game devices has the same structure. The front central portion of the game device A1 includes a display 21 for displaying game pictures. At the left side of the display 21, an outlet slot 28 is located for dispensing a new card pack 35 (described below) whenever a game is finished. At the right side of the display 21, a coin slot 22 is located. In order to start a game, a player should deposit one or more coins of a predetermined amount into the coin slot 22.

A first console panel 25 extending horizontally is situated below the display 21. On the center of the first console panel 25, there is provided a stage 221 on which various cards used for the professional wrestling game will be placed. A second console panel 26 is located in the vicinity of the first console panel 25. There is a step between the first console panel 25 and the second console panel 26. On the left side of the first console panel 25, there is provided a manual operation button set constituting four manual operation buttons 23a, 23b, 23c, and 23d. The manual operation button 23a through 23d serve as an input unit by which a player instructs the player's virtual wrestler to attempt a pinfall cover on the opponent. Two manual operation buttons 24a and 24b are located on the right side of the first console panel 25. The manual operation button 24a serves as an input unit by which a player instructs the player's wrestler to counterattack against the opponent when an attack is received from the opponent. The manual operation button 24b serves as an input unit by which a player instructs the player's wrestler to perform ukemi (a falling technique to minimize injury) when an attack is received from the opponent.

Playing the professional wrestling game requires the use of an entry card 30, a wrestler card 31, and a technique card 32. On each entry card 30, a unique card ID is recorded. Each player possesses an entry card 30 for identifying the player when a game is started. The card ID thus functions as an identifier for identifying each player.

Each wrestler card 31 corresponds to a wrestler, i.e., a virtual game character that can appear in the professional wrestling game. Therefore, there are as many types of wrestler cards 31 as there are wrestlers that can appear in the professional wrestling game. However, in a rare case, a plurality of types of wrestler cards 31 may be prepared in conformity to a plurality of characters performed by a single wrestler since even a single wrestler may perform as a heel (i.e., a villain), a babyface (i.e., a good guy), a masked wrestler, a strong wrestler, and/or a weak wrestler. On each wrestler card 31, there are recorded a wrestler ID for identifying a wrestler (game character) and wrestler information corresponding to the wrestler ID. The wrestler information includes the wrestler's name, a portrait of the wrestler, and initial values of parameters of the wrestler that will be described later.

Each technique card 32 corresponds to an attack technique that virtual wrestlers launch against opponents in the professional wrestling game. Therefore, there are as many types of technique cards 32 as there are attack techniques that can be used on the professional wrestling game. On each technique card, there is recorded a technique ID for identifying an attack technique ID.

In an exemplified embodiment, a card ID is magnetically recorded on an entry card 30 whilst each of a wrestler ID and a technique ID is represented as a bar code on a wrestler card 31 or a technique card 32. Such bar codes are printed with an invisible ink (so-called stealth ink) having a high transmittance with respect to visible light.

A bar code reader 250 is situated at an edge of the first console panel 25. As will be described later, the bar code reader 250 reads bar codes printed on wrestler cards and technique cards used in the professional wrestling game. A player will place a card on the second console panel 26 and slide it transversely under the bar code reader 250 for inputting the information on the card. If the stealth ink absorbs or reflects infrared light, the bar code reader 250 has a light emitter for emitting infrared light and a light receiver for receiving infrared light. However, the wavelength features of the light emitter and receiver can be selected depending on the reflection and absorption characteristics of the stealth ink used.

A card slot 27 is formed at the right side of the second console panel 26. When a player has inserted the player's entry card 30 into the card slot 27, the card ID recorded on the entry card 30 can be read.

Figure 3:
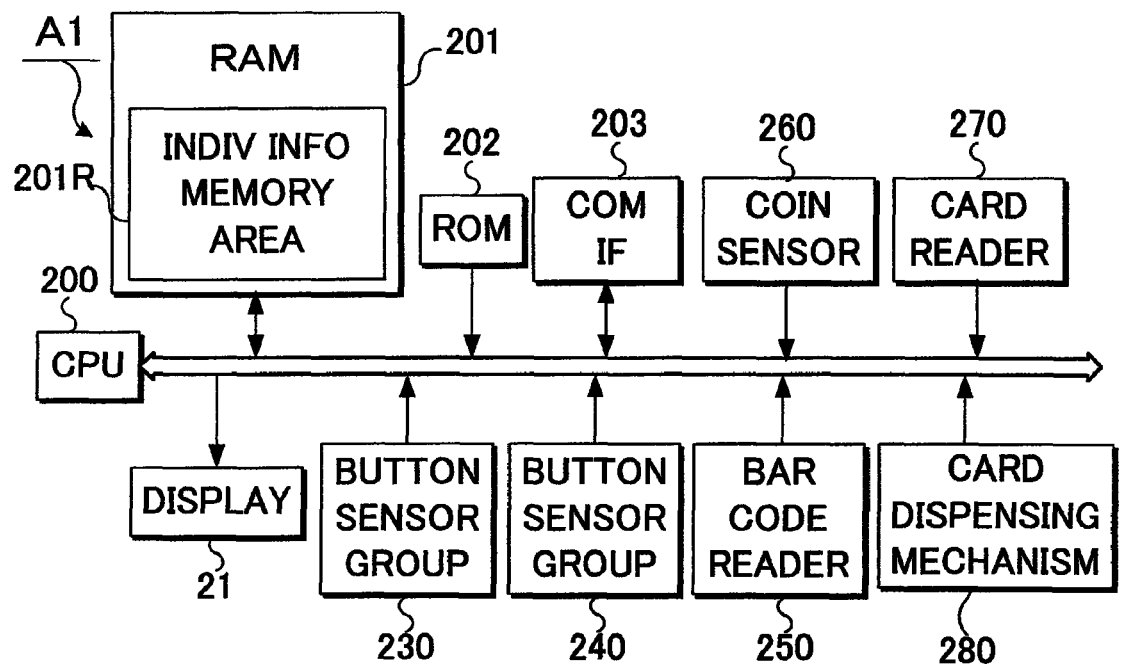
FIG. 3 is a block diagram showing a structure of the game device in FIG. 2.

FIG. 3 shows the electric structure of the game device A1. Each of the other game devices has the same structure. A CPU 200 is connected with other structural elements via a bus and functions as a main controller. A RAM (random access memory) 201 used as a work area of the CPU 200 stores a previous-opponent-device list. In the previous-opponent-device list, one or more identifiers for identifying one or more opponents against that the game device has already competed during a knockout tournament are recorded. More specifically, as the identifier, a communication address of the game device used by such an opponent is recorded in the previous-opponent-device list. A ROM (read only memory) 202 stores a game program and the like. The CPU 200 controls the whole game device A1 in compliance with the game program. The game device may include another type of storage device, such as a hard disk, DVD, or the like for storing the game program and image data.

A communication interface 203 communicates with the router 20 (see FIG. 1) in compliance with a predetermined protocol under control of the CPU 200. The display 21 is a CRT (cathode ray tube), liquid crystal display, plasma display, or another suitable image display. A button sensor group 230 consists of four button sensors, which correspond to the manual operation buttons 23a through 23d, respectively. Each of four button sensors outputs a manipulation signal according to manipulation of the corresponding manual operation buttons (one of 23a through 23d) by a player. Similarly, a button sensor group 240 corresponds to the manual operation buttons 24a and 24b.

The bar code reader 250 reads bar codes printed on wrestler cards or technique cards and outputs a wrestler ID or a technique ID in response to reading. A coin sensor 260 detects that a coin has been inserted through the coin slot 26, and then outputs a detection signal. A card reader 270 reads a card ID on an entry card and then outputs the card ID when an entry card is inserted into the card slot 27. A card dispensing mechanism 280 dispenses through the outlet slot 28 a new card pack 35 that is presented to a player as privilege in exchange for playing the professional wrestling game whenever a game is finished. In a card pack 35, a wrestler card 31 or a technique card 32 is wrapped. By obtaining a card pack 35, a player can use a newly obtained wrestler card 31 or technique card 32 in the next opportunity of playing the game. Accordingly, a player can register a new wrestler with the player's entity or increase variation of techniques that can used in a match, so that the amusement factor is improved.

Figure 4:
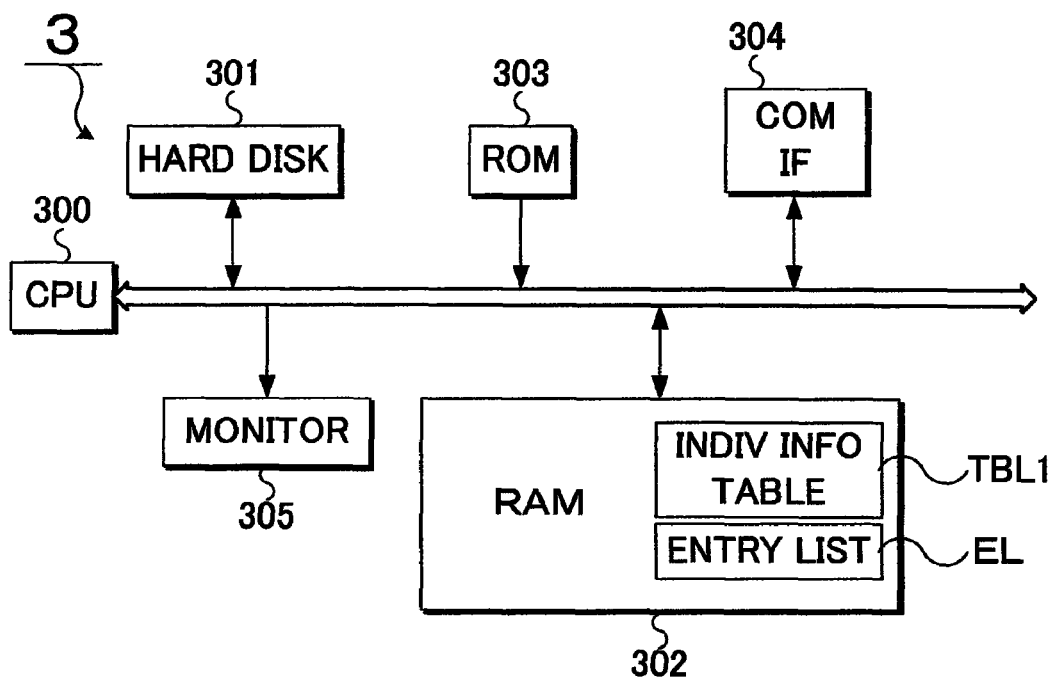
FIG. 4 is a block diagram showing a structure of a server device within the game system in FIG. 1.

FIG. 4 shows an electric structure of the server device 3. The server device 3 includes a function to store individual information for each card ID, a function to calculate a registration fee for each wrestler in accordance with the degree of popularity of each wrestler, and a function to designate an opponent game device in order that two game devices compete against each other. The registration fee is a fee necessary for players to newly employ a wrestler. The server device 3 includes a CPU 300, a hard disk 301, a ROM 303, a communication interface 304, and a monitor 305. The hard disk 301 stores a control program. The CPU 300 extracts the control program into the RAM 302, and then executes various processes. The RAM 302 used as a work area of the CPU 300 stores an individual information table TBL1 and an entry list EL.

A communication address indicating a game device that is waiting for its opponent can be registered in the entry list EL. Communication addresses of game devices are used as information for identifying game devices or as information for specifying opponents. Upon receiving an entry request from a game device, the server device 3 records on the entry list EL the communication address and the receiving time. The server device 3 searches at predetermined intervals the entry list EL for information having a receiving time from which a predetermined period has passed, and deletes such information from the entry list EL. The server device 3 then sends a deletion response to the game device indicated by the communication address that has been deleted from the entry list EL, the deletion response indicating that the communication address of the game device has been deleted from the entry list EL. Upon receiving the deletion response, the game device knows that no opponent has appeared and executes a game in which the opponent is the CPU 200 thereof. On the other hand, when the entry list EL stores a communication address of a game device and when the server device 3 receives an entry request from another game device, the server device 3 informs the game device that has sent the new entry request of the communication address of the game device stored in the entry list EL. Upon receiving the communication address of the other game device, the game device sends a matchup request to the game device corresponding to the communication address reported by the server device 3. Thus, matchmaking is completed and players on each side can play a match against each other using these game devices.

Figure 5:
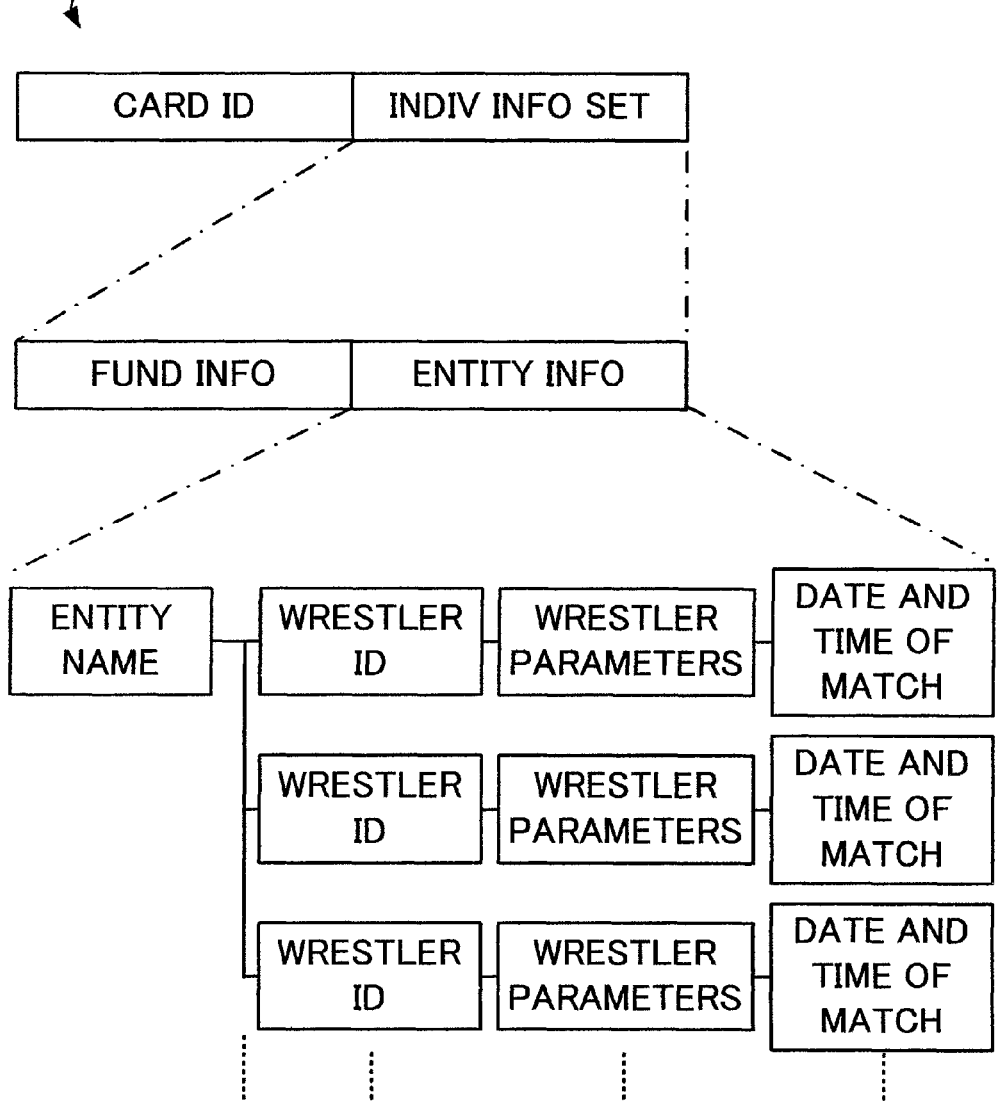
FIG. 5 is a schematic diagram showing a data structure of an individual information table stored in the server device in a FIG. 4.

FIG. 5 shows the data structure of the individual information table TBL1. The individual information table TBL1 stores a plurality of sets, each set consisting of a card ID and an individual information set. The individual information set includes fund information that is associated with an individual card ID and entity information. The fund information indicates an amount of a virtual fund possessed by the entity managed by the player identified by the card ID. The amount of funds increases when the entity gains an income by holding a show, but decreases by registration of wrestler and by rental of an arena.

The entity information includes the entity name, wrestler IDs, wrestler parameters, and the date and time of match. The entity name is the name of entity managed by the corresponding player. An entity is limited to a predetermined number of wrestlers (ten in this embodiment). Each wrestler ID associated with an entity name indicates a wrestler belonging to the entity. In such a game, if registration of a large number of types of wrestlers with an entity is allowed, data of wrestlers with respect to an entity will be huge. Since the server device 3 that holds data indicating registered wrestlers for many entities should deliver such data to game devices appropriately, such huge amounts of data will increase the workload for the server device 3 and the network. In order to avoid increase of the workload, in this embodiment, the number of wrestlers that can be registered with each entity is limited.

Each wrestler ID is associated with a plurality of wrestler parameters. The wrestler parameters include power, speed, skill, and toughness. The power, speed, and skill are wrestler parameters in connection with the wrestler's offensive capability. The toughness is a wrestler parameter indicating the wrestler's durability against harm received from the opponent. These wrestler parameters can be improved by sending the wrestler in a match or by training the wrestler. Each wrestler ID is also associated with the date and time of match. The date and time of match indicates the date and time at which the wrestler played a match.

Thus, the individual information table TBL1 functions as an individual information memory part. In this embodiment, the individual information table TBL1 is stored in the RAM 302, but may be stored in another suitable storage device, such as a hard disk.

Returning to FIG. 4, the ROM 303 stores a boot program, which is read out when the server device 3 is booted up. The communication interface 304 communicates with the plurality of game devices settled in the game arcades A and B, via the router 3R (see FIG. 1). The CPU 300 makes the monitor 305 display operational states.

Figure 6:
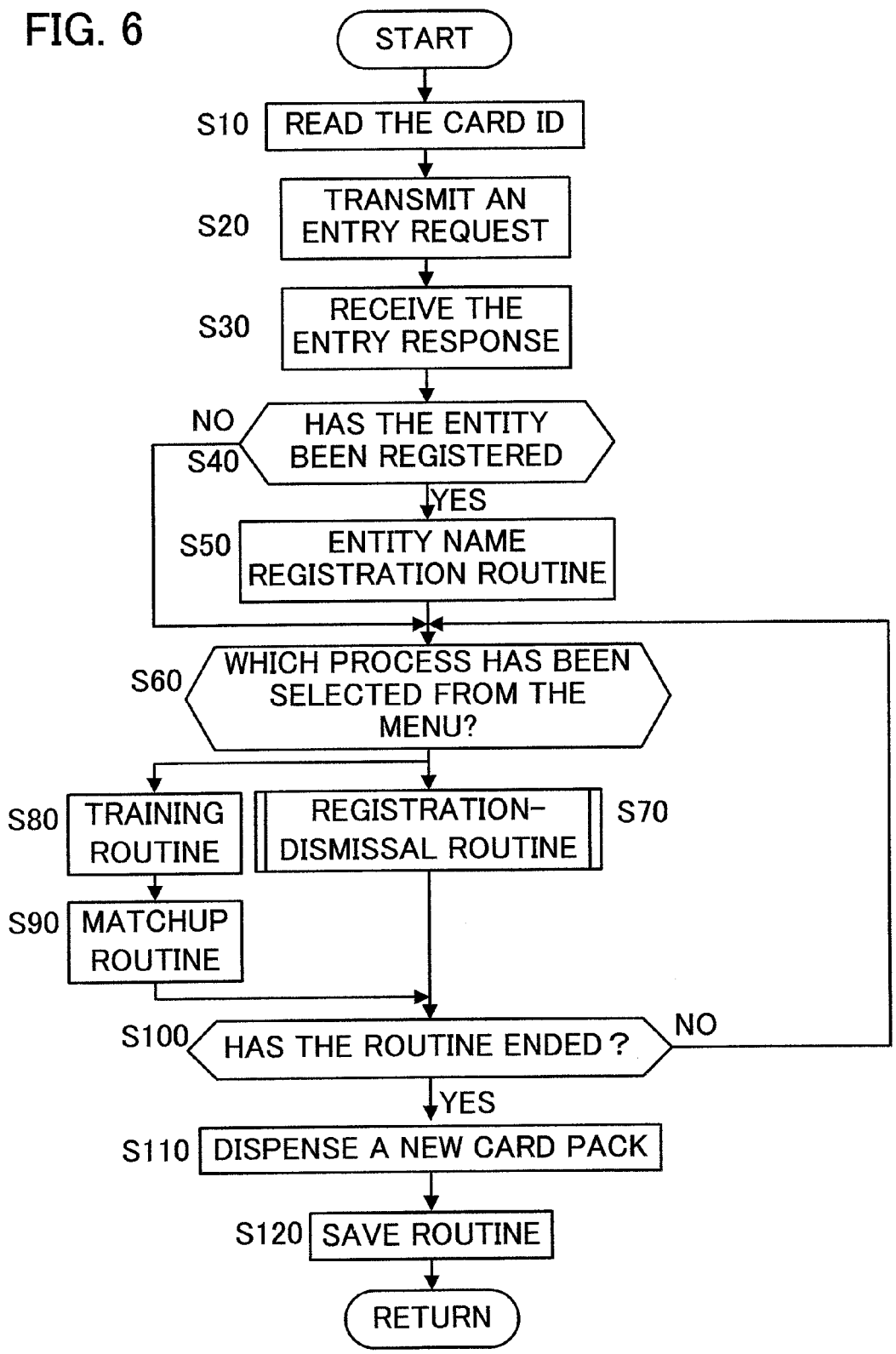
FIG. 6 is a flow chart showing operations executed in each game device in FIG. 2.

Next, operations of the game system 100 will be described. Lets us assume that a player will use the game device A1 for playing the professional wrestling game. FIG. 6 is a flow chart showing operations executed in the game device A1. If the player would like to play the professional wrestling game for the first time, the player should buy a starter pack at an automatic card vending machine. The starter pack includes an entry card 30, a wrestler card 31, and five technique cards 32. Then, the player can start playing the professional wrestling game using the entry card 30, and so on within the starter pack.

When the game device A1 is activated, the CPU 200 of the game device A1 sends the server device 3 a registration fee information delivery request requesting for delivery of a registration fee list. Upon receiving the registration fee information delivery request, the server device 3 serves as a registration fee information deliverer that generates a delivery response including a registration fee list and returns the delivery response to the game device A1. The game device A1 stores in the RAM 201, which is a first storage device, the registration fee list received from the server device 3. The registration fee list indicates the registration fee for each of wrestlers that can appear in the professional wrestling game.

Figures 7, 8:
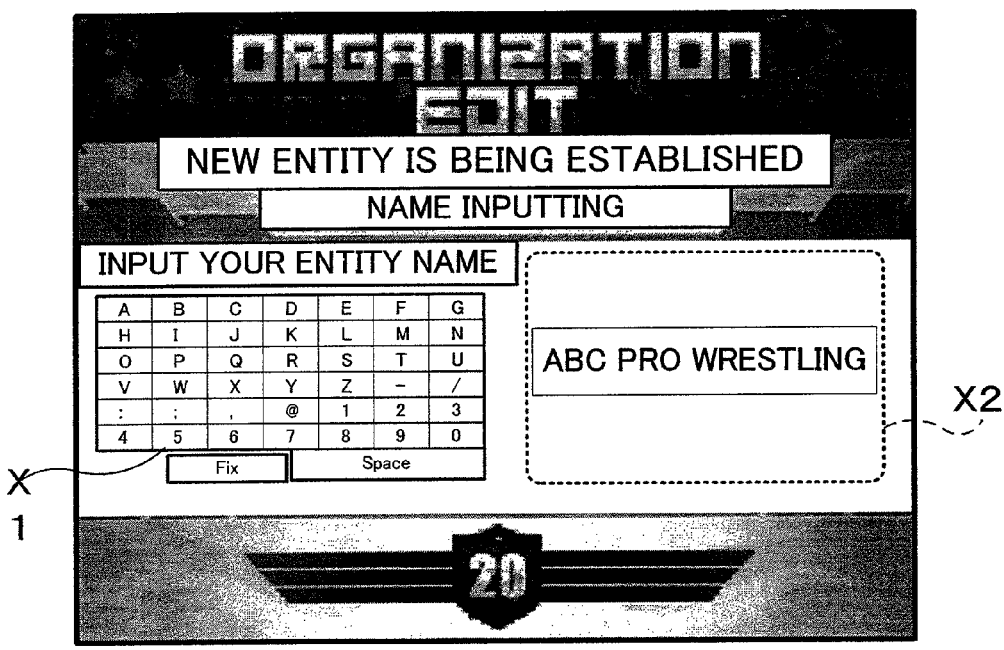
FIG. 7 is a schematic diagram showing a data structure of a registration fee list transferred from the server device in FIG. 4 to each game device in FIG. 2.
FIG. 8 is an illustration showing an example of an image that may be displayed on each game device in FIG. 2 at an entity name registration.

FIG. 7 shows an example of the registration fee list. For example, the registration fee for the wrestler corresponding to the wrestler ID "0002" is 3,500,000. By referring to the registration fee list, the fee necessary for registering each wrestler can be known. In this embodiment, the server device 3 changes registration fees for some or all of the wrestlers in the professional wrestling game, in accordance with popularity of wrestlers. The recalculation of registration fees will be described below.

When the player inserts the entry card 30 into the card slot 27, the CPU 200 reads the card ID from the entry card 30 and then writes the card ID into an individual information memory area 201R (step S10). Then, the CPU 200 transmits an entry request indicating the card ID recorded on the individual information memory area 201R to the server device 3 (step S20). The entry request reaches the server device 3 and is received by the CPU 300. The CPU 300 reads from the individual information table TBL1 an individual information set corresponding to the card ID indicated by the present entry request. Next, the CPU 300 generates an entry response including this individual information set and returns the entry response to the game device A1. Therefore, an entry request is not only a message of a player using a game device for requesting the server device 3 to designate the opponent in order to start playing, but is also a message (individual information acquisition request) for requesting that the server device 3 send to the game device the individual information set in connection with the player. An entry response including an individual information set is an individual information acquisition response replying to an entry request. The CPU 200 of the game device is an individual information acquisition requester that transmits an individual information acquisition request to the server device 3 and receives an individual information acquisition response from the server device 3. The CPU 300 of the server device 3 is an individual information acquisition replier that returns an individual information acquisition response to a game device in response to an individual information acquisition request. However, if individual information table TBL1 does not store an individual information set corresponding to the received card ID, the CPU 300 generates an entry response containing a nonregistration indication indicating that the player has not been registered, and a registration fee list, and returns the entry response to the game device A1.

Upon receiving the entry response, the game device A1 stores in the individual information memory area 201R of the RAM 201 the individual information set included in the entry response (step S30). The RAM 201 thus serves as a second storage device for storing an individual information set. Then, the CPU 200 determines whether or not the entity corresponding to the card ID has been registered (step S40). More specifically, if an entry response containing an individual information set has been received, the CPU 200 determines that the player's entity has been registered. If an entry response containing a nonregistration indication has been received, the CPU 200 determines that the player's entity has not been registered.

If it has been determined that the player's entity has not been registered, the CPU 200 advances the routine to step S50, and executes an entity name registration routine. In the entity name registration routine, the CPU 200 makes the display 21 show an entry name registration image for registration of the entity name, and prompts the player to input the entity name and a password by means of this image. FIG. 8 shows an example of such an entry name registration image. When the player manipulates the manual operation buttons and selects characters within the character table in area X1, thereby inputting the entity name, area X2 will show the entity name in response. In this example, the entity name is "ABC PRO WRESTLING". Thereafter, when the player manipulates the manual operation buttons and fixes the input entity name, the CPU 200 adds the entity name in the individual information set stored in the individual information memory area 201R.

However, if it has been determined that the entity has been registered, the CPU 200 makes the display 21 show a menu image (step S60). The menu image represents a menu including "Start a match" and "Manage my entity".

When the player has selected a process from among the menu, the CPU 200 determines which process has been selected (step S70) and executes an operation according to the selection. If the player has selected "Manage my entity", the CPU 200 executes a registration-dismissal routine. In this routine, a wrestler is registered with or dismissed from the player's entity corresponding to the card ID.

Figure 9:
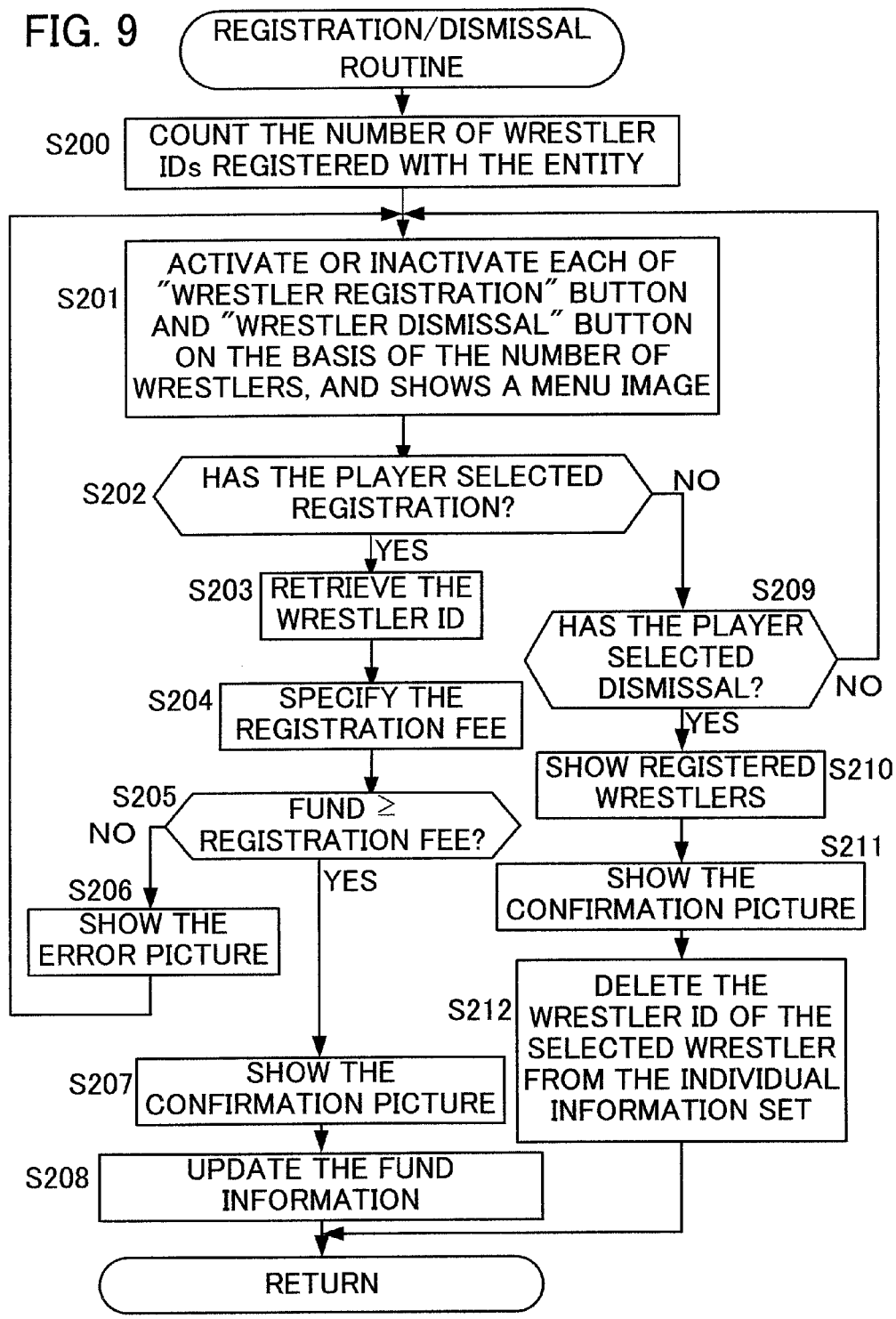
FIG. 9 is a flow chart showing a registration-dismissal routine that may be executed in each game device in FIG. 2.
Figure 10:
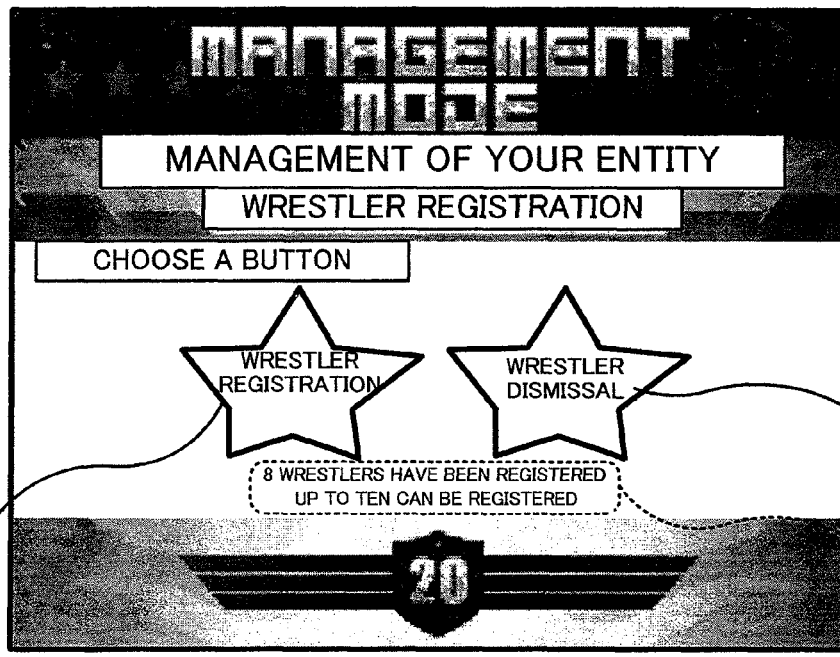
FIG. 10 is an illustration showing an example of a menu image that may be displayed on each game device in FIG. 2.

FIG. 9 is a flow chart showing operations of the registration-dismissal routine executed by the game device A1. First, the CPU 200 refers to the individual information set recorded on the individual information memory area 201R, and counts the number of wrestler IDs registered with the entity corresponding to the card ID (step S200). Next, the CPU 200 selects activity or inactivity (permissibility or impermissibility) of each of "wrestler registration" and "wrestler dismissal" on the basis of the number of wrestlers registered with the entity, and shows a menu image of which an example is shown in FIG. 10 (step S201). In this menu image, a registration button X3 is prepared for registering a wrestler and a dismissal button X4 is prepared for dismissing a wrestler.

The CPU 200 shows in area X5 the number of registered wrestlers according to the counted number of the wrestler IDs. In addition, the CPU 200 activates the registration button X3 for allowing a wrestler to be registered if the number of wrestler IDs in the individual information memory area 201R is less than a predetermined threshold (for example, ten). Otherwise, the CPU 200 inactivates the registration button X3 in order to disable registration of a new wrestler. Furthermore, if the number of registered wrestler IDs is less than another predetermined threshold (for example, one), the CPU 200 inactivates the dismissal button X4 in order to disable dismissal of a wrestler. Otherwise, the CPU 200 activates the dismissal button X4 for allowing a wrestler to be dismissed.

In this example, area X5 shows the number of wrestlers registered at present and the upper limit of the number of wrestlers. If this display is omitted, a player may misunderstand and think that the inactivation of the registration button X3 is a failure of the device if the player does not recognize the upper limit number or the number of registered wrestlers. In this example, that which is shown in area X5 will prevent a player from misunderstanding. In an alternative embodiment, only that which is shown in area X5 is conducted, but activation and deactivation of registration button X3 and dismissal button X4 are omitted.

Figure 11:
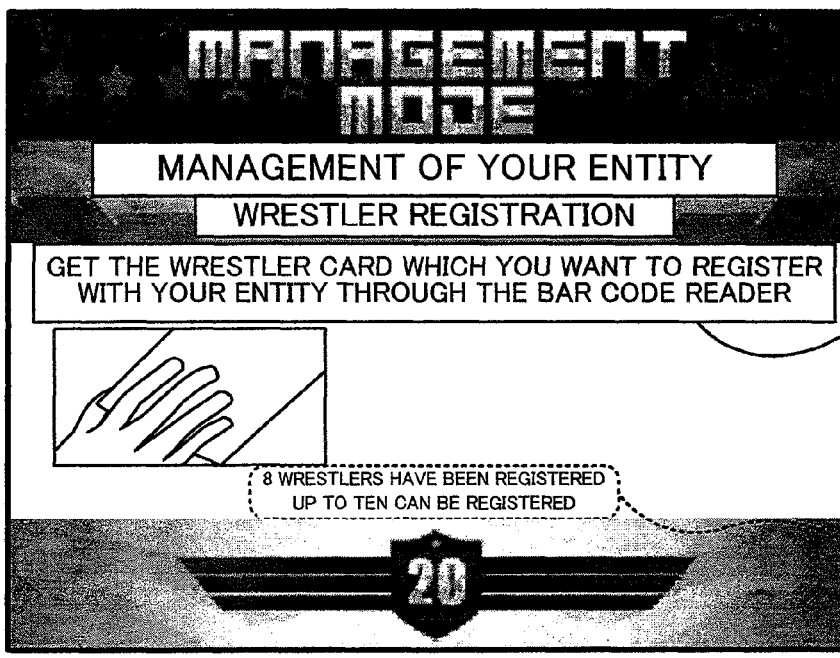
FIG. 11 is an illustration showing an example of an image that may be displayed on each game device in FIG. 2 for facilitating a player to register a wrestler.

Next, the CPU 200 determines whether or not the player has selected registration of a wrestler (step S202). If the determination is affirmed by the player's selection of registration of a wrestler, the CPU 200 makes the display 21 show a message for facilitating registration of a wrestler (for example, "Get the wrestler card which you want to register with your entity through the bar code reader") as shown in FIG. 11. When the player gets the player's desirable wrestler card 31 through the bar code reader 250 as a result of the message, the CPU 200 retrieves from the wrestler card the wrestler ID (step S203). The CPU 200 then specifies the registration fee corresponding to this wrestler ID on the basis of the registration fee list (step S204).

Next, the CPU 200 reads the fund information from the individual information memory area 201R, and serves as a comparer that determines whether or not the current amount of fund indicated by the fund information is equal to or greater than the registration fee for the wrestler (step S205). If the amount of fund is less than the registration fee, the CPU 200 makes the display 21 show an error message image and returns the routine to step S201. The error message image includes a message that the wrestler cannot be registered because of lack of funds.

However, if the amount of fund is equal to or greater than the registration fee, the CPU 200 serves as a registration permitter that permits registration of the wrestler with the player's entity. More specifically, the CPU 200 makes the display 21 show a registration confirmation picture (step S207). This registration confirmation picture contains images of wrestler information (the wrestler's name, the wrestler's portrait, and the initial values of the wrestler parameters) retrieved from the wrestler card, an image of the registration fee for the wrestler provided by the server device, an image of the entity name, an image of the amount of the management fund, and an image of messages for guiding registration and cancellation.

Next, the CPU 200 waits for completion of the player's registration or cancellation. More specifically, the CPU 200 determines whether or not the registration has been instructed, and determines whether or not the cancellation has been instructed if the registration has not been instructed. If the registration or the cancellation has not been instructed, the CPU 200 returns the routine to step S201. Let us assume that during the waiting state, the player has instructed the registration by manipulating the manual operation buttons. In this case, the CPU 200 registers the wrestler with the player's entity and updates the amount of the management fund of the player's entity (step S208). More specifically, the CPU 200 newly writes into individual information memory area 201R the wrestler ID and the initial values of the wrestler parameters retrieved from the wrestler card. The CPU 200 overwrites into the individual information memory area 201R fund information indicating the new amount of management funds that is the amount of management funds read last from the individual information memory area 201R minus the registration fee for the wrestler, and shows a message that the registration of the wrestler has been completed. Accordingly, the CPU 200 serves as a second updater that updates the individual information set in the RAM 201 so as to contain the wrestler ID and new fund information.

If the player has not selected registration until step S202, the CPU 200 determines whether or not dismissal has been selected (step S209). If the player has not select dismissal, the CPU 200 returns the routine to step S201. On the other hand, if the player has selected dismissal, the CPU 200 makes the display 21 show all wrestlers corresponding to all wrestler IDs registered with the entity information in the individual information set corresponding to the card ID (step S210) for inducing the player to specify a wrestler to be dismissed. When the player specifies the wrestler to be dismissed by manipulating the manual operation buttons, the CPU 200 makes the display 21 show a dismissal confirmation picture (step S211). The dismissal confirmation picture contains images of wrestler information (the wrestler's name, the wrestler's portrait, the wrestler parameters, and the registration fee) of the wrestler to be dismissed, an image of the entity name, an image of the amount of the management fund, and an image of messages for guiding dismissal and cancellation.

Next, the CPU 200 waits for completion of the player's dismissal or cancellation. More specifically, the CPU 200 determines whether or not the dismissal has been instructed, and determines whether or not the cancellation has been instructed if the dismissal has not been instructed. If the dismissal or the cancellation has not been instructed, the CPU 200 returns the routine to step S201. Let us assume that during the waiting state, the player has instructed the dismissal by manipulating the manual operation buttons. In this case, the CPU 200 deletes the wrestler ID of the dismissed wrestler from the individual information set stored in the individual information memory area 201R (step S212).

As described above, a registration fee is necessary for registering a wrestler with an entity and the registration is allowed only when the amount of funds is equal to or greater than the registration fee. Therefore, if the registration fee for a wrestler is high, the number of requests of registering the wrestler will be reduced, and if the registration fee is low, the number of requests of registering the wrestler will be raised Referring back to FIG. 6, until step S60, the player has selected "Start a match," the CPU 200 executes a training routine (step S80). As described above, the wrestler's offensive capability and durability are governed by wrestler parameters. The training routine trains a wrestler and updates the wrestler parameters.

Figure 12:
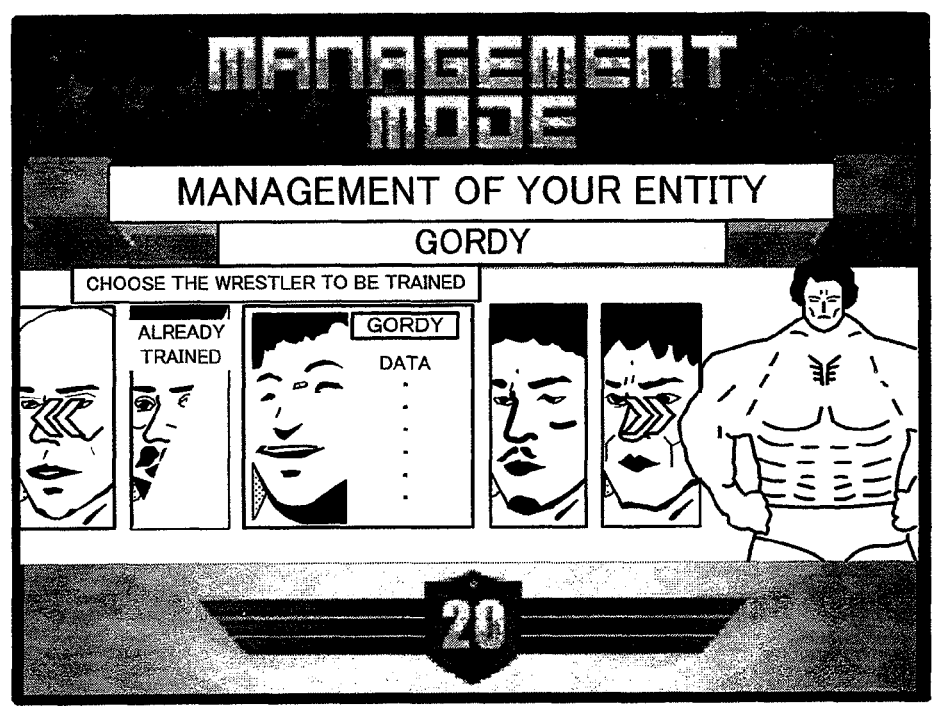
FIG. 12 is an illustration showing an example of a selection menu image that may be displayed on each game device in FIG. 2 for facilitating a player to select a wrestler who should train for a match.

In the training routine, the CPU 200 makes the display 21 display a wrestler selection menu image by which the player selects a wrestler to be trained. In the game program of this example, the wrestler trained through the training routine will be entered for a match. FIG. 12 shows an example of the wrestler selection menu image. At the center of the wrestler selection menu image, portraits and wrestler parameters of candidate wrestlers are displayed. When the player manipulates the manual operation buttons to scroll the wrestler portraits transversely, the candidate wrestler may be changed. When the player has fixed the wrestler to be trained by manipulating the manual operation buttons, the CPU 200 makes the display 21 show a training menu image in which are prepared "power training," "speed training," "toughness training," "technique polishing," and so on. "Power training" is designed to improve the power parameter. "Speed training" is designed to improve the speed parameter. "Toughness training" is designed to improve the toughness parameter. "Technique polishing" is designed to improve the skill parameter. When "technique polishing" is selected, the player must get the technique card 32 through the bar code reader 250 so as to designate the technique to be polished. By virtue of training, one or more wrestler parameters of the wrestler are changed, so that the CPU 200 updates the contents of the individual information set recorded in the individual information memory area 201R.

Then, the CPU 200 executes a matchup routine (step S90). In the matchup routine, the CPU 200 first makes the display 21 show an arena selection menu image for facilitating choice of an arena from among a plurality of arenas. If the player has selected and confirmed an arena by manipulating the manual operation buttons, the arena is specified. Next, the CPU 200 makes the display 21 show an image for facilitating choice of matchup mode. Candidates of matchup mode include intra-arcade matchup mode in which the opponent is sought within the same game arcade, global matchup mode in which the opponent is sought all over the world, and CPU matchup mode in which a computer is the opponent. If intra-arcade matchup mode or global matchup mode has been selected, the game device A1 sends an entry request to the server device 3. The server device 3 determines the opponent on the basis of the entry list as described above, and informs the game device A1 of the other game device that is the opponent. Thereafter, the CPU 200 starts executing various procedures for a matchup.

Arenas prepared in the professional wrestling game have different capacities and accordingly require different rental fees. The greater the capacity, the higher the rental fee. The box-office income for an entity at one show is determined by the product of the ticket price and the number of spectators. The ticket price may be determined for each arena or may be fixed irrespective of arena. The number of spectators is determined on the basis of the degree of excitement of the spectators at the latest show of the same entity. The degree of excitement of the spectators depends on details of a match. More specifically, a match is divided into a plurality of parts, and a measure of the degree of harmonization of the practical course and the predetermined scenario is calculated as points for each of the parts, whereby the excitement degree is calculated. For example, let us assume that a match is divided into three parts. Each of these parts is associated with a preferred story evolution. For example, in a match between a heel wrestler and a babyface wrestler, high points will be given at the first part when simple attacks are exchanged. At the second part, high points will be given when the heel wrestler is in the advantageous position by, for example, rough attacks. At the third part, when the babyface wrestler endures and finally wins with a deadly blow, high points will be given. The excitement degree is a sum of the points of each part. The number of spectators in the next show reflects the current excitement degree of spectators thus obtained depending on details of a match, so that the player can feel amusement of managing shows in addition to the win-or-loss results of individual matchups.

When a match has been finished, the CPU 200 serves as a first updater for updating the fund information on the basis of the details of the match. A new amount of funds, Z2, after finishing a match, is calculated by Equation (1).

$$Z2=Z1-K+C*M \quad (1)$$

where Z1 is the amount of fund (the current amount of fund) before starting the matchup routine, K is the rental fee of the arena, C is the ticket price, and M is the number of spectators.

The CPU 200 updates the individual information set in the individual information memory area 201R in such a manner that the new individual information set contains the fund information indicating the new amount of funds Z2 calculated in accordance with Equation (1).

Then, the CPU 200 makes the display 21 show an image for facilitating continuation of the professional wrestling game, and determines whether or not the player has deposited a coin and has instructed continuation of the game within a predetermined time (step S100). If continuation of the game has been instructed, the CPU 200 returns the routine to step S60. However, if the player has not selected continuation of the game, the CPU 200 controls the card dispensing mechanism 280 to dispense a new card pack 35 (step S10).

Next, the CPU 200 executes a save routine (step S120). In the save routine, the CPU 200 serves as an individual information update requester. That is, the CPU 200 retrieves the card ID and the individual information set from the individual information memory area 201R; generates an individual information update request that includes data indicating the calculated excitement degree of spectators, the card ID, and the individual information set; and transmits the individual information update request to the server device 3. If a new wrestler has been registered and the matchup routine has been executed, the individual information set in the individual information update request contains character or wrestler information indicating the wrestler ID newly registered with the player's entity and fund information indicating the amount of fund updated in accordance with details of the match minus the registration fee for the newly registered wrestler (or the amount of funds reflecting details of the match minus the registration fee for the newly registered wrestler). Therefore, the individual information set in the individual information update request contains the update results by both of the first updater and the second updater. On the other hand, if the matchup routine has been executed but registration of a new wrestler has not been executed (no new wrestler has been registered), only the update result of the first updater is included in the individual information set to be sent to the server device 3. In contrast, if only registration of a wrestler has been executed (a new wrestler has been newly registered), only the update result of the second updater is included in the individual information set to be sent to the server device 3. If a wrestler has been dismissed, the individual information set in which the wrestler ID of the dismissed wrestler has been deleted is transmitted to the server device 3. In summary, whenever the matchup routine, the registration of a wrestler, or the dismissal of a wrestler has been executed, the individual information set in the individual information memory area 201R is overwritten and updated. The latest updated result of the individual information set is sent to the server device 3 when the player quits the continuing process in the game device.

The server device 3 serves as an individual information updater. That is to say, upon receiving an individual information update request, the server device 3 refers to the card ID in the request, and updates the individual information set in the individual information table TBL1 corresponding to the card ID by replacing the individual information set by the individual information set included in the individual information update request. The individual information set updated by the server device 3 contains data indicating the excitement degree of spectators in connection with the corresponding entity. Upon receiving a next entry request indicating the same card ID from a game device, the server device 3 transmits an entry response containing the data indicating the excitement degree of spectators to the requesting game device, and therefore the requesting game device can determine the number of spectators on the basis of the latest excitement degree of spectators.

Figure 13:
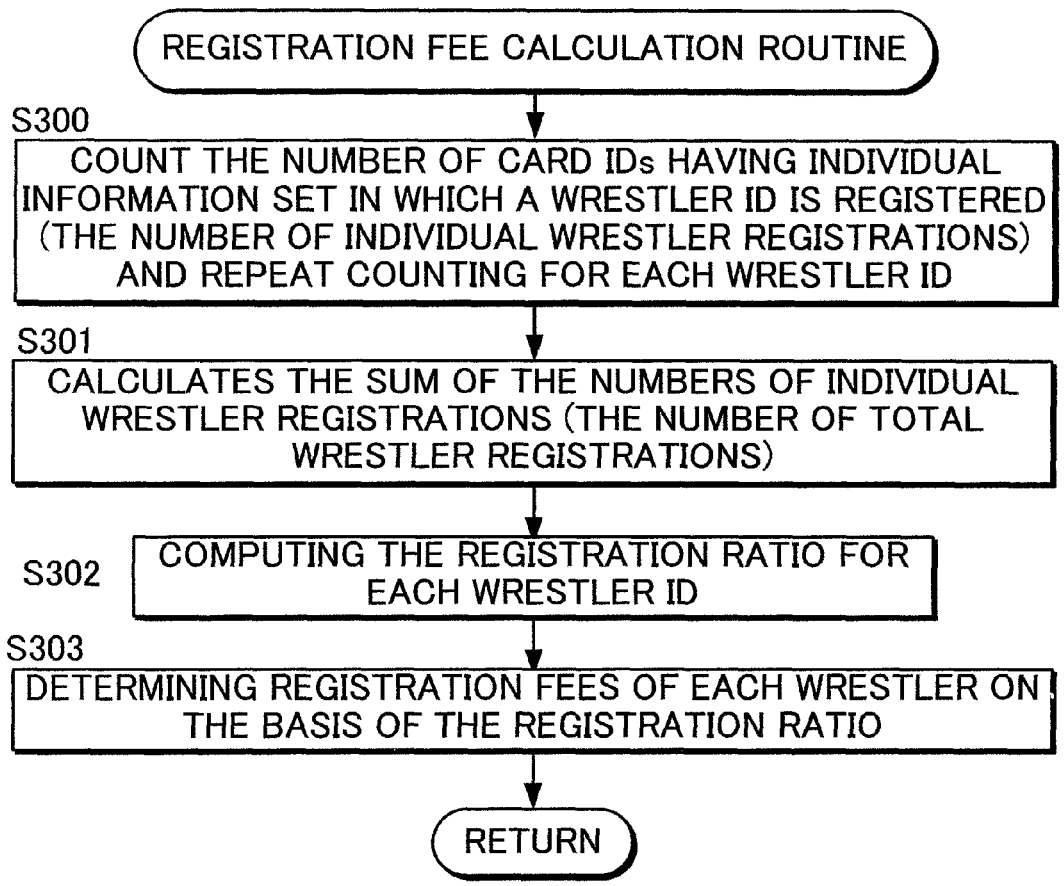
FIG. 13 is a detailed flow chart showing a registration fee calculation routine that may be executed in the server device in FIG. 4.

Next, a registration fee calculation routine executed in the server device 3 will be described. FIG. 13 is a flow chart showing the registration fee calculation routine. First, the CPU 300 refers to the individual information table TBL1, and counts the number of card IDs having individual information set in which a wrestler ID is registered (the number of individual wrestler registrations). The CPU 300 repeats counting for each wrestler ID (step S300). Thus, the number of individual wrestler registrations with respect to a wrestler is the number of players (more exactly, the number of entry cards) who uses the wrestler.

Next, the CPU 300 calculates the number of total wrestler registrations that is the sum of the numbers of individual wrestler registrations (step S301). For example, let us assume that one hundred wrestlers can appear in the professional wrestling game and that wrestler IDs from "0001" to "0100" are assigned to the wrestlers, respectively. FIG. 14 shows examples of numbers of individual wrestler registrations counted for wrestler IDs, respectively. In FIG. 14, the numbers of individual wrestler registrations for wrestler IDs "0001" through "0100" are P1 through P100, respectively.

The number of total wrestler registrations Q is calculated as follows:

$$Q=P1+P2\ldots+P100$$

Then, the CPU 300 serves as a degree of popularity computer for computing the registration ratio for each wrestler ID (step S302). The registration ratio is an index of the degree of popularity of a wrestler, and is calculated as a ratio of the number of individual wrestler registrations for the wrestler ID to the number of total wrestler registrations. Therefore, the registration ratio for a wrestler ID is the ratio of the number of entities with which the wrestler is registered to the total of the numbers of all entities with which all wrestlers are registered. For example, the registration ratio for wrestler ID "0001" is P1/Q. When a wrestler's popularity is higher, the wrestler may be registered with a large number of entities. This raises the number of entities with which the wrestler is registered, so that the registration ratio for that wrestler is also raised. On the other hand, the number of entities with which an unpopular wrestler is registered may be less, so that the registration ratio for that wrestler will be low.

Next, the CPU 300 serves as a registration fee determiner for determining registration fees of each wrestler on the basis of the registration ratio for each wrestler (step S303). The method for determining registration fees is such that the higher a registration ratio, the more expensive the registration fee. The method for determining registration fees may be, but is not limited to, one of the following schemes.

In a first scheme, a standard value of a registration fee is determined for each wrestler ID in advance, and the new registration fee for each wrester is a result of increasing or decreasing of the standard value on the basis of the deviation value of the registration ratio. For example, when REF(X) is the standard value of a registration fee for a wrestler ID, R(X) is the registration ratio for the wrestler ID, $R_{AVR}$ is the average of registration ratios for all wrestlers, and K is a coefficient for increasing or decreasing the registration fee, the new registration fee H(X) corresponding to the registration ratio R(X) is calculated by Equation (2).

$$H(X)=REF(X)+K^*(R(X)-R_{AVR}) \qquad (2)$$

In this scheme, the CPU 300 may calculate the average $R_{AVR}$ of registration ratios for all wrestlers on the basis of all registration ratios R(X) for all wrestler ID, and may then calculate the registration fee H(X) by Equation (2). Consequently, the CPU 300 executes a first process for calculating the deviation value between the registration ratio of each individual wrestler and the average of registration ratios for all wrestlers, and then executes a second process for determining the registration fee for each individual wrestler by increasing or decreasing of the standard value on the basis of the deviation value.

However, a maximum limit and a minimum limit of the registration fee may be set. Since the number of registrations for a more popular wrestler will be enhanced convergently, resulting in a very expensive registration fee, a player who starts the game after others may be at a disadvantage. This disadvantage may be minimized by setting the maximum limit and the minimum limit of the registration fee.

In a second scheme, the first scheme is modified in such a manner that the new registration fee for each wrester is determined on the basis of incidence probability of each wrestler card 31 in addition to the factors used in the first scheme. The incidence probability is the ratio of the number of issued wrestler cards of a wrestler type (wrestler ID) to the total number of all wrestler cards issued by the game provider. In other words, the incidence probability is the probability that the wrestler card in a card pack dispensed from the card outlet slot 28 after finishing the game is the corresponding type of wrestler card. The wrestler's offensive capability and defensive capability differ depending on individual wrestlers, and there may be one of the wrestlers who has an outstanding offensive capability and therefore is very strong. The incidence probability of the wrestler card corresponding to such a strong wrestler is set lower than those of other wrestler cards. Since players cannot register wrestlers with their entities without having wrestler cards, the registration ratio will be lower for a wrestler of which the incidence probability is lower. Accordingly, registration fees may be changed in accordance with each incidence probability.

More specifically, when REF(X) is the standard value of the registration fee for a wrestler ID, R(X) is the registration ratio for the wrestler ID, $R_{AVR}$ is the average of registration ratios for all wrestlers, K1 is a coefficient for increasing or decreasing the registration fee, S(X) is the incidence probability S(X) of the wrestler card 31 corresponding to the wrestler ID, $S_{AVR}$ is the average of incidence probabilities of all wrestler cards, and K2 is a coefficient for compensation, the new registration fee H(X) corresponding to the registration ratio R(X) is calculated by Equation (3).

$$H(X)=REF(X)+K1^*(R(X)-R_{AVR})+K2^*(S(X)-S_{AVR}) \qquad (3)$$

In the second scheme, in a manner similar to that in the first scheme, a maximum limit and a minimum limit of registration fee may be set. The compensation of registration fees on the basis of the incidence probabilities does not need to be performed for all wrestlers. In other words, the compensation of registration fees may be performed for only some of wrestlers on the basis of the incidence probabilities, in which the wrestlers correspond to rare cards of which the incidence probabilities are extremely low.

In a third scheme, the new registration fee for each wrester is determined on the basis of incidence probability of each wrestler card 31 and an expected value of the registration ratio. The expected value of the registration ratio is a value predetermined for each wrestler card 31 in advance by the game designer, and is an expected registration ratio determined on the basis of the total number of all types of wrestler cards 31 and the incidence probability of a wrestler card 31.

More specifically, when REF(X) is the standard value of registration fee for a wrestler ID, R(X) is the registration ratio for the wrestler ID, K1 is a coefficient for increasing or decreasing the registration fee, and Rex is the expected value of the registration ratio for the wrestler ID, the new registration fee H(X) corresponding to the registration ratio R(X) is calculated by Equation (4).

$$H(X)=REF(X)+K1^*(R(X)/Rex) \qquad (4)$$

The expected value Rex of the registration ratio for a wrestler ID is for example calculated by Equation (5).

$$Rex=(1/Q)^*(S(X)/S_{AVR}) \qquad (5)$$

where Q is the total number of all types of wrestler cards 31, S(X) is the incidence probability of a wrestler card 31 corresponding to the wrestler ID, and $S_{AVR}$ is the average of incidence probabilities of all wrestler cards.

In this third scheme, a ratio R(X)/Rex of the actual registration ratio to the predetermined expected value (standard value) of the registration ratio is calculated, and then the ratio R(X)/Rex is multiplied by the coefficient, thereby obtaining a compensation term. In this example, when R(X)/Rex equals one, the new registration fee H(X) becomes a median value that is REF(X)+K1. If the actual registration ratio exceeds the expected value of the registration ratio, i.e., R(X)/Rex is greater than one, the registration fee H(X) is raised above the median value, which is REF(X)+K1. On the other hand, if the actual registration ratio is less than the expected value of the registration ratio, i.e., R(X)/Rex is less than one, the registration fee H(X) is lowered below the median value, which is REF(X)+K1.

In the third scheme, in a manner similar to that in the first scheme, a maximum limit and a minimum limit of the registration fee may be set. The compensation of registration fees may be performed for only some of the wrestlers on the basis of the incidence probabilities.

In a fourth scheme, a maximum limit and a minimum limit of the registration fee are predetermined; the maximum limit is associated with the actual maximum registration ratio (the highest value among all registration ratios for all wrestler IDs), and the minimum limit is associated with the actual minimum registration ratio (the lowest value among all registration ratios for all wrestler IDs). The registration fee for a wrestler ID is determined on the basis of the level of the registration ratio of the wrestler ID within the range from the maximum registration ratio to the minimum registration ratio. The new registration fee H(X) for a wrestler ID corresponding to the registration ratio R(X) for the wrestler ID is calculated by Equation (6).

$$H(X)=H_{MIN}+(H_{MAX}-H_{MIN})*(R(X)-R_{MIN})/(R_{MAX}-R_{MIN}) \qquad (6)$$

where $H_{MAX}$ is the maximum limit of the registration fee, $H_{MIN}$ is the minimum limit of registration fee, $R_{MAX}$ is the maximum registration ratio, and $R_{MIN}$ is the minimum registration ratio.

In a fifth scheme, the range from the maximum registration ratio to the minimum registration ratio is divided into a plurality of ranks. The registration fee for a wrestler ID is determined on the basis of the rank to which the registration ratio of the wrestler ID belongs. For example, a first rank is determined as an extent from the minimum registration ratio and less than 5%, a second rank is determined as another extent from 5% and less than 10%, and a third rank is determined as another extent from 10% to the maximum registration ratio. In this case, the registration fee for a wrestler ID that belongs to the first rank may be 1 million, the registration fee for a wrestler ID that belongs to the second rank may be 2 million, and the registration fee for a wrestler ID that belongs to the third rank may be 3 million.

As described above, in the first embodiment, the registration fees necessary for registration of wrestlers are changed depending on registration ratios of wrestlers with entities (i.e., degrees of popularity of wrestlers). Therefore, convergence of registrations of a more popular wrestler can be prevented, and registrations of wrestlers can be diversified, resulting in reducing the probability that wrestlers of the same characteristics will play a match against each other, so that the amusement factor is improved. In addition, since the registration fee for an unpopular wrestler can be reduced, the utility value of the wrestler card corresponding to such a wrestler for players will be enhanced, thereby stimulating exchange of such a wrestler card among players. Furthermore, since the utility value of the wrestler card corresponding to an unpopular wrestler for players will be enhanced, the worth of card packs that players obtain is enhanced, whereby the rate of operation of each game device can be improved.

In the first embodiment, the index of degree of popularity of each wrestler is the registration ratio of each wrestler with entities that is calculated as the ratio of the number of individual wrestler registrations to the number of total wrestler registrations. However, the index of degree of popularity is not limited to the above-described embodiment. For example, the index of degree of popularity of each wrestler may be a registration ranking of wrestlers for a certain period. This ranking can be calculated on the basis of not only the latest registration ratios but also former registration ratios and the records of wins and losses. In another alternative embodiment, the index of degree of popularity of each wrestler may be the number of individual wrestler registrations of each wrestler rather than the registration ratio of each wrestler. In summary, the index of degree of popularity of each wrestler may be selected so that the registration fee for a wrestler that more players will want to register with their entities can be set higher.

Second Embodiment

In the above-described first embodiment, registration fees are changed depending on registration ratios of wrestlers. In the second embodiment, each registration fee is changed depending on the number of matches that each wrestler has entered. The game system according to the second embodiment includes the same structure as that of the game system 100 according to the first embodiment shown in FIG. 1. Operations of each game device and the server device 3 are essentially the same as those in the first embodiment, but there is a difference in that each game device according to the second embodiment can transmit entered-wrestler information to the server device 3, and the server device 3 determines registration fees on the basis of the number of matches that each wrestler has entered.

More specifically, the CPU 200 of a game device writes into its individual information memory area 201R the wrestler ID (entered-wrestler information) of a wrestler that has been currently entered in a match. The entered-wrestler information is specific information specifying a wrestler that a player has used for a match. Thus, the CPU 200 serves as a specific information generator that specifies the wrestler used in a competition and generates specific information. In addition, the CPU 200 sends, at the save routine (step S120 in FIG. 6), entered-wrestler information to the server device 3. Consequently, the CPU 200 serves as a specific information transmitter that transmits the specific information to the server device 3. The CPU 200 may send the server device 3 entered-wrestler information as a component of the individual information update request or as another information flow. The CPU 300 of the server device 3 counts the number of matches that each wrestler entered on the basis of entered-wrestler information received from each game device, and records the number of matches for each wrestler into a management table TBL2 stored in the RAM 302

FIG. 15 shows contents of the management table TBL2. In FIG. 15, each of the values within the cells indicates the number of matches a wrestler entered each day. In this example, the table records the number of matches each wrestler entered for the last 35 days (five weeks). Every day, the number of matches for each wrestler is updated in such a manner that the oldest data is overwritten.

The CPU 300 serves as a usage ratio computer for computing a usage ratio of each wrestler that is the ratio of the number of matches that each wrestler entered to the sum of the numbers of matches for all wrestlers. The usage ratio of each wrestler is the frequency of each wrestler having been used for competitions. More specifically, the CPU 300 calculates every week the usage ratio of each wrestler that is equivalent to a moving average. Thus, the CPU 300 updates the usage ratio of each wrestler once a week, which is the basis for the calculation of the registration fees. The reason for updating the usage ratio once a week is that the rate of operation of each game device changes depending on the day of the week. For example, many players go to arcades on weekends, so as to increase the number of matches for each wrestler.

Figure 16:
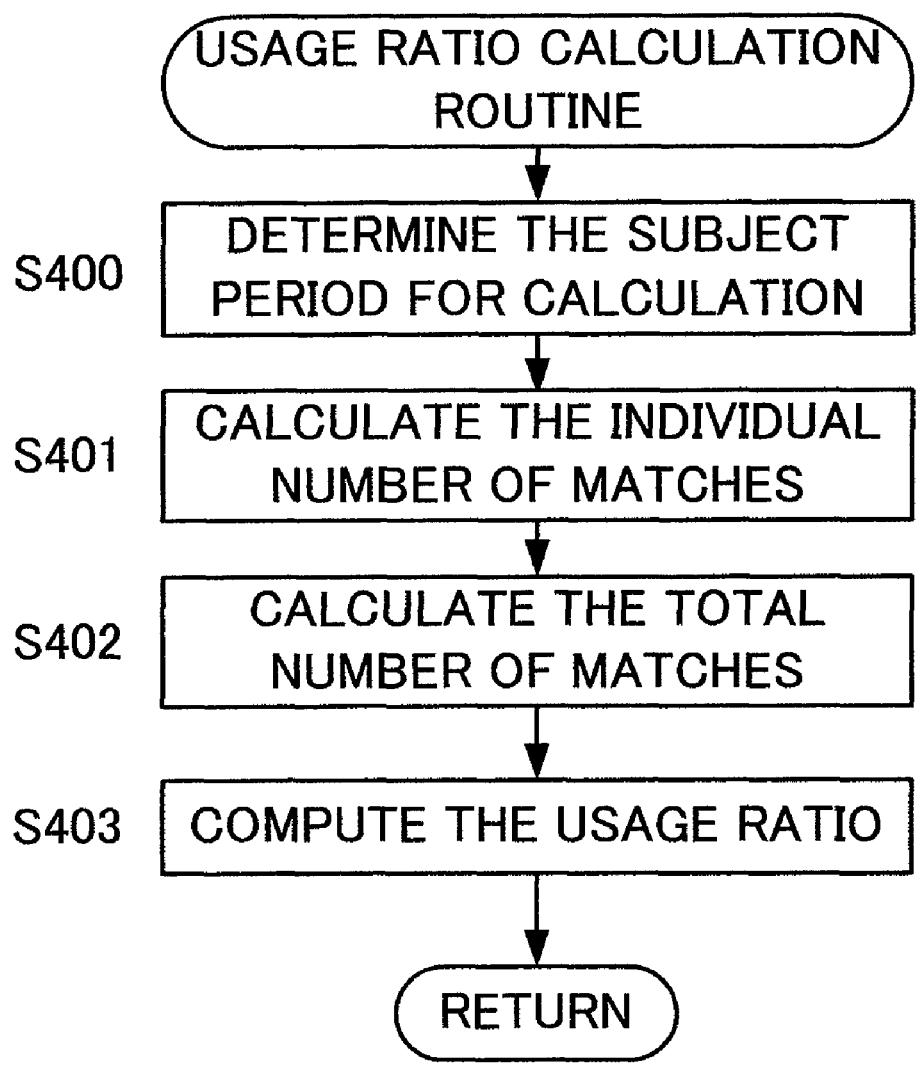
FIG. 16 is a flow chart showing a usage ratio calculation routine executed in the server device according to the second embodiment of the present invention for calculating the usage ratio of each wrestler.

The CPU 300 executes a usage ratio calculation routine shown in FIG. 16. First, the subject period on which the usage ratio is calculated is determined (step S400). For example, the last four weeks ending with the last Sunday are determined as the subject period on which the usage ratio is calculated. Next, the CPU 300 refers to the management table TBL2 and calculates the number of matches that each wrestler entered in the subject period. The CPU 300 stores the number of matches that each wrestler entered (individual number of matches for each wrestler) at step S401. Then, the CPU 300 calculates the sum of the individual numbers of matches for all wrestlers (the total number of matches) at step S402. The number of matches is the sum of the numbers of matches competed in by all wrestlers in the subject period. Next, the CPU 300 computes the usage ratio of each wrestler by dividing the individual number of matches for each wrestler by the total number of matches (step S403).

Then, the CPU 300 serves as a registration fee determiner for determining registration fees of each wrestler on the basis of the usage ratio for each wrestler. The method for determining registration fees is such that the higher the usage ratio, the more expensive the registration fee. The method for determining registration fees may be, but is not limited to, one of the following schemes.

In a first scheme, a standard value of a registration fee is determined for each wrestler ID in advance, and the new registration fee for each wrester is a result of increasing or decreasing of the standard value on the basis of the deviation value of the usage ratio. For example, when REF(X) is the standard value of the registration fee for a wrestler ID, V(X) is the usage ratio for the wrestler ID, $V_{AVR}$ is the average of usage ratios for all wrestlers, and K is a coefficient for increasing or decreasing the registration fee, the new registration fee H(X) corresponding to the usage ratio V(X) is calculated by Equation (7).

$$H(X)=REF(X)+K*(V(X)-V_{AVR}) \qquad (7)$$

In this scheme, the CPU 300 may calculate the average $V_{AVR}$ of usage ratios for all wrestlers on the basis of all registration ratios V(X) for all wrestler IDs, and may then calculate the registration fee H(X) by Equation (7). Consequently, the CPU 300 executes a first process for calculating the deviation value between the usage ratio of each individual wrestler and the average of usage ratios for all wrestlers, and then executes a second process for determining the registration fee for each individual wrestler by increasing or decreasing of the standard value on the basis of the deviation value.

However, a maximum limit and a minimum limit of the registration fee may be set. This is because setting a registration fee that differs greatly from the standard value may lead to very few registrations and may degrade the amusement factor.

In a second scheme, the first scheme is modified in such a manner that the new registration fee for each wrestler is determined on the basis of incidence probability of each wrestler card 31 in addition to the factors used in the first scheme. When REF(X) is the standard value of registration fee for a wrestler ID, V(X) is the usage ratio for the wrestler ID, $V_{AVR}$ is the average of usage ratios for all wrestlers, K1 is a coefficient for increasing or decreasing the registration fee, S(X) is the incidence probability S(X) of the wrestler card 31 corresponding to the wrestler ID, $S_{AVR}$ is the average of incidence probabilities of all wrestler cards, and K2 is a coefficient for compensation, the new registration fee H(X) corresponding to the usage ratio V(X) is calculated by Equation (8).

$$H(X)=REF(X)+K1*(V(X)-V_{AVR})+K2*(S(X)-S_{AVR}) \qquad (8)$$

In the second scheme, in a manner similar to that in the first scheme, a maximum limit and a minimum limit of the registration fee may be set. The compensation of registration fees may be performed for only some of the wrestlers on the basis of the incidence probabilities, in which the wrestlers correspond to rare cards for which the incidence probabilities are extremely low.

In a third scheme, the new registration fee for each wrester is determined on the basis of the incidence probability of each wrestler card 31 and an expected value of the usage ratio. The expected value of the usage ratio is a value predetermined for each wrestler card 31 in advance by the game designer, and is an expected usage ratio determined on the basis of the total number of all types of wrestler cards 31 and the incidence probability of a wrestler card 31.

More specifically, when REF(X) is the standard value of the registration fee for a wrestler ID, V(X) is the usage ratio for the wrestler ID, K1 is a coefficient for increasing or decreasing the registration fee, and Vex is the expected value of the usage ratio for the wrestler ID, the new registration fee H(X) corresponding to the usage ratio V(X) is calculated by Equation (9).

$$H(X)=REF(X)+K1*(V(X)/Vex) \qquad (9)$$

The expected value Vex of the usage ratio for a wrestler ID is for example calculated by Equation (10).

$$Vex=(1/Q)*(S(X)/S_{AVR}) \qquad (10)$$

where Q is the total number of all types of wrestler cards 31, S(X) is the incidence probability of a wrestler card 31 corresponding to the wrestler ID, and $S_{AVR}$ is the average of incidence probabilities of all wrestler cards.

In this third scheme, a ratio V(X)/Vex of the actual usage ratio to the predetermined expected value (standard value) of the usage ratio is calculated, and then the ratio V(X)/Vex is multiplied by the coefficient, thereby obtaining a compensation term. In this example, when V(X)/Vex equals one, the new registration fee H(X) becomes a median value that is REF(X)+K1. If the actual usage ratio exceeds the expected value of the usage ratio, i.e., V(X)/Vex is greater than one, the registration fee H(X) is raised than the median value, which is REF(X)+K1. On the other hand, if the actual usage ratio is less than the expected value of the usage ratio, i.e., R(X)/Rex is less than one, the registration fee H(X) is lowered than the median value, which is REF(X)+K1.

In the third scheme, as similar to the first scheme, a maximum limit and a minimum limit of registration fee may be set. The compensation of registration fees may be performed for only a part of wrestlers on the basis of the incidence probabilities.

In a fourth scheme, a maximum limit and a minimum limit of registration fee are predetermined, the maximum limit is associated with the actual maximum usage ratio (the highest value among all usage ratios for all wrestler IDs), and the minimum limit is associated with the actual minimum usage ratio (the lowest value among all usage ratios for all wrestler IDs). The registration fee for a wrestler ID is determined on the basis of the level of the usage ratio of the wrestler ID within the extent from the maximum usage ratio to the minimum usage ratio. The new registration fee H(X) for a wrestler ID corresponding to the usage ratio R(X) for the wrestler ID is calculated by Equation (11).

$$H(X) = H_{MIN} + (H_{MAX} - H_{MIN}) * (V(X) - V_{MIN})/(V_{MAX} - V_{MIN})$$ (11)

where $H_{MAX}$ is the maximum limit of registration fee, $H_{MIN}$ is the minimum limit of registration fee, $V_{MAX}$ is the maximum usage ratio, and $V_{MIN}$ is the minimum usage ratio.

In a fifth scheme, the extent from the maximum usage ratio to the minimum usage ratio is divided into a plurality of ranks. The registration fee for a wrestler ID is determined on the basis of the rank to which the usage ratio of the wrestler ID belongs. For example, a first rank is determined as a range from the minimum usage ratio and less than 5%, a second rank is determined as another range from 5% and less than 10%, and a third rank is determined as another range from 10% to the maximum usage ratio. In this case, the registration fee for a wrestler ID that belongs to the first rank may be 1 million, the registration fee for a wrestler ID that belongs to the second rank may be 2 million, and the registration fee for a wrestler ID that belongs to the third rank may be 3 million.

As described above, in the second embodiment, registration fees necessary for registration of wrestlers are changed depending on usage ratios of wrestlers by entities. Therefore, convergence of registrations of a more popular wrestler can be prevented, and registrations of wrestlers can be diversified, resulting in reducing the probability that wrestlers of the same characteristics will play a match against each other, so that the amusement factor is improved. In addition, since the registration fee for an unpopular wrestler can be reduced, the utility value of the wrestler card corresponding to such a wrestler for players will be enhanced, thereby stimulating exchange of such a wrestler card among players. Furthermore, since the utility value of the wrestler card corresponding to an unpopular wrestler for players will be enhanced, the worth of card packs that players obtain is enhanced, whereby the rate of operation of each game device can be improved.

While the present invention has been described such that a professional wrestling game has been used as an example of practical use, it is to be understood that the purpose of the present invention is not limited to the particular embodiments described above. The above-described network game can be applied to any other type of game in which a game character registered with an entity managed by a player plays against another game character registered with another entity managed by another player. The term "game character" as used in the specification may be an athlete of another sport, a robot, an animal, or a chimerical game character. Any system computing registration fees necessary for registering such game characters with players' entities on the basis of degree of popularity (for example, registration ratio) or usage ratio falls within the scope of the present invention.

In the above-described embodiments, card IDs (identifiers) are magnetically recorded on entry cards (first information recording media) 30, and the card reader (first reader) 270 reads the card ID magnetically recorded on an entry card. However, identifiers for identifying each player may be magnetically recorded on disks, sticks, or any other suitable machine-readable information recording media. In addition, identifiers for identifying each player may be recorded as visible or invisible bar codes or as any other optically-readable two-dimensional codes on cards or any other suitable recording media.

In the above-described embodiments, wrestler IDs (character information) are recorded on wrestler cards (second information recording media) 31 as bar codes, and the bar code reader (second reader) 250 reads the wrestler ID recorded as a bar code on a wrestler card. However, the character information may be magnetically recorded on disks, sticks, or any other suitable machine-readable information recording media. In addition, the character information may be recorded as any other optically-readable two-dimensional codes on cards or any other suitable recording media.

Although the server device 3 is a single unit in the above-described embodiments, the server device may include a plurality of units, for example, one unit for calculating registration fees and distributing them to game devices and another unit for managing the individual information set and sending it to the corresponding game device.

The invention claimed is:

1. A game system comprising a server device and a plurality of game devices communicable with the server device, wherein each of the game devices registers at least one game character from among a plurality of prepared game characters with an entity managed in a virtual space by a player, engages in a competition with another of the game devices, using a game character that is specified by a player from among said at least one registered game character, and computes, based on details of a competition, an amount of a virtual fund held by an entity, wherein the server device comprises:

an individual information memory part that stores an identifier identifying a player and an individual information set including character information specifying at least one game character registered by the player with an entity that the player manages and fund information indicating an amount of a virtual fund possessed by the entity, the identifier and the individual information set being stored in association with each other;

an individual information acquisition replier that, upon receiving from one of the game devices an individual information acquisition request containing an identifier of a player, acquires from the individual information memory part an individual information set corresponding to the received identifier, and transmits to the game device having transmitted the individual information acquisition request an individual information acquisition response containing the acquired individual information set;

an individual information updater that, upon receiving from one of the game devices an individual information update request containing an identifier and an updated individual information set, updates an individual information set stored in association with the received identifier in the individual information memory part by replacing the stored individual information set with the updated individual information set;

a degree of popularity computer that computes a degree of popularity for each of the prepared game characters, the degree of popularity relating to a number of entities with which each game character is registered, the computation being performed by referring to information stored in the individual information memory part;

a registration fee determiner that generates, based on the degree of popularity computed by the degree of popularity computer, registration fee information for each of the prepared game characters, the registration fee information indicating a registration fee in virtual money necessary for registering each game character with an entity; and a registration fee information deliverer that delivers to the game devices registration fee information for each game character determined by the registration fee determiner, and wherein each of the game devices comprises:

a first reader that reads, from a first information recording medium storing an identifier identifying a player, the identifier;

a second reader that reads, from a second information recording medium storing character information specifying a game character, the character information;

an input unit that receives an input instruction from a player;

a first storage device that stores registration fee information for each of the prepared game characters received from the server device;

an individual information acquisition requester that transmits, before a game, to the server device an individual information acquisition request containing the identifier and requesting for an individual information set corresponding to the identifier, the individual information acquisition requester receiving from the server device an individual information acquisition response containing the individual information set;

a second storage device that stores the individual information set received by the individual information acquisition requester;

a first updater that updates, after finishing a game, based on details of the game, fund information of the individual information set stored in the second storage device;

a comparer that, upon reading the character information by the second reader, reads from the first storage device registration fee information for the game character corresponding to the character information read by the second reader, and compares a current amount of the virtual fund indicated by the fund information to a registration fee indicated by the registration fee information for the game character;

a registration permitter that permits registration of the game character to an entity managed by a player identified by the identifier in a case in which a result of the comparison by the comparer shows that the current amount of the virtual fund is equal to or greater than the registration fee;

a second updater that, upon permission of registration of the game character by the registration permitter, obtains new fund information by deducting the registration fee for the game character from the current amount of the virtual fund, and updates the individual information set stored in the second storage device so as to contain the new fund information and the character information of the registered game character; and an individual information update requester that generates, upon updating the individual information set by at least one of the first and second updaters, an individual information update request containing the updated individual information set and the identifier, the individual information update requester transmitting the individual information update request to the server device.

2. The game system of claim 1, wherein the registration fee determiner executes a first process of computing a deviation of a degree of popularity for each prepared game character from an average degree of popularity of the plurality of prepared game characters and a second process of determining the registration fee for each prepared game character by increasing or decreasing a value of a standard registration fee by a value corresponding to the deviation.

3. The game system of claim 2, wherein each game device further comprises a dispensing mechanism for dispensing a new second information recording medium when a game has been finished; and wherein, in the second process, the registration fee determiner determines the registration fee for at least a part of the prepared game characters by increasing or decreasing a value of a standard registration fee on the basis of the deviation and an incidence probability of each game character showing a probability that a game character indicated by the game character information recorded on the new second information recording medium dispensed from the dispensing mechanism is the corresponding game character.

4. The game system of claim 1, wherein each game device further comprises a delivery requester that generates, at the time of each game device being activated, a registration fee information delivery request requesting for delivery of the registration fee information, and that transmits to the server device the registration fee information delivery request; and wherein the registration fee information deliverer of the server device, upon receiving a registration fee information delivery request from one of the game devices, transmits the registration fee information to the game device having transmitted the registration fee information delivery request.

5. The game system of claim 2, wherein each game device further comprises a delivery requester that generates, at the time of each game device being activated, a registration fee information delivery request requesting for delivery of the registration fee information, and that transmits to the server device the registration fee information delivery request; and wherein the registration fee information deliverer of the server device, upon receiving a registration fee information delivery request from one of the game devices, transmits the registration fee information to the game device having transmitted the registration fee information delivery request.

6. The game system of claim 3, wherein each game device further comprises a delivery requester that generates, at the time of each game device being activated, a registration fee information delivery request requesting for delivery of the registration fee information, and that transmits to the server device the registration fee information delivery request; and wherein the registration fee information deliverer of the server device, upon receiving a registration fee information delivery request from one of the game devices, transmits the registration fee information to the game device having transmitted the registration fee information delivery request.

7. A game system comprising a server device and a plurality of game devices communicable with the server device, wherein each of the game devices registers at least one game character from among a plurality of prepared game characters with an entity managed in a virtual space by a player, engages in a competition with another of the game devices, using a game character that is specified by a player from among said at least one registered game character, and computes based on details of a competition an amount of a virtual fund possessed by an entity, wherein the server device comprises:

an individual information memory part that stores an identifier identifying a player and an individual information set including character information specifying at least one game character registered by the player with an entity that the player manages and fund information indicating an amount of a virtual fund possessed by the entity, the identifier and the individual information set being stored in association with each other;

an individual information acquisition replier that, upon receiving from one of the game devices an individual information acquisition request containing an identifier of a player, acquires from the individual information memory part an individual information set corresponding to the received identifier, and transmits to the game device having transmitted the individual information acquisition request an individual information acquisition response containing the acquired individual information set;

an individual information updater that, upon receiving from one of the game devices an individual information update request containing an identifier and an updated individual information set, updates an individual information set stored in association with the received identifier in the individual information memory part by replacing the stored individual information set with the updated individual information set;

a usage ratio computer that computes, for each of the prepared game characters, a usage ratio indicating frequency of each game character having been used for competitions, based on specific information received from the game devices, the specific information specifying a game character used in a competition at each game device;

a registration fee determiner that generates, based on the usage ratio computed by the usage ratio computer, registration fee information for each of the prepared game characters, the registration fee information indicating a registration fee in virtual money necessary for registering each game character with an entity; and a registration fee information deliverer that delivers to the game devices registration fee information for each game character determined by the registration fee determiner, and wherein each of the game devices comprises:

a first reader that reads, from a first information recording medium storing an identifier identifying a player, the identifier;

a second reader that reads, from a second information recording medium storing character information specifying a game character, the character information;

an input unit that receives an input instruction from a player;

a first storage device that stores registration fee information for each of the prepared game characters received from the server device;

an individual information acquisition requester that transmits, before a game, to the server device an individual information acquisition request containing the identifier and requesting for an individual information set corresponding to the identifier, the individual information acquisition requester receiving from the server device an individual information acquisition response containing the individual information set;

a second storage device that stores the individual information set received by the individual information acquisition requester;

a first updater that updates, after finishing a game, based on details of the game, fund information of the individual information set stored in the second storage device;

a comparer that, upon reading the character information by the second reader, reads from the first storage device registration fee information for the game character corresponding to the character information read by the second reader, and compares a current amount of the virtual fund indicated by the fund information to a registration fee indicated by the registration fee information for the game character;

a registration permitter that permits registration of the game character to an entity managed by a player identified by the identifier in a case in which a result of the comparison by the comparer shows that the current amount of the virtual fund is equal to or greater than the registration fee;

a second updater that, upon permission of registration of the game character by the registration permitter, obtains new fund information by deducting the registration fee for the game character from the current amount of the virtual fund, and updates the individual information set stored in the second storage device so as to contain the new fund information and the character information of the registered game character;

a specific information generator that generates specific information specifying a game character used in a competition at the game device;

an individual information update requester that generates, upon updating the individual information set by at least one of the first and second updaters, an individual information update request containing the updated individual information set and the identifier, the individual information update requester transmitting the individual information update request to the server device; and a specific information transmitter that transmits the specific information generated by the specific information generator to the server device.

8. The game system of claim 7, wherein the registration fee determiner executes:

a first process of computing a deviation of a usage ratio for each prepared game character from an average usage ratio of the plurality of prepared game characters; and a second process of determining the registration fee for each prepared game character by increasing or decreasing a value of a standard registration fee by a value corresponding to the deviation.

9. The game system of claim 8, wherein each game device further comprises a dispensing mechanism for dispensing a new second information recording medium when a game has been finished; and wherein, in the second process, the registration fee determiner determines the registration fee for at least a part of the prepared game characters by increasing or decreasing a value of a standard registration fee on the basis of the deviation and an incidence probability of each game character showing a probability that a game character indicated by the game character information recorded on the new second information recording medium dispensed from the dispensing mechanism is the corresponding game character.

10. The game system of claim 7, wherein each game device further comprises a delivery requester that generates, at the time of each game device being activated, a registration fee information delivery request requesting for delivery of the registration fee information, and that transmits to the server device the registration fee information delivery request; and wherein the registration fee information deliverer of the server device, upon receiving a registration fee information delivery request from one of the game devices, transmits the registration fee information to the game device having transmitted the registration fee information delivery request.

11. The game system of claim 8, wherein each game device further comprises a delivery requester that generates, at the time of each game device being activated, a registration fee information delivery request requesting for delivery of the registration fee information, and that transmits to the server device the registration fee information delivery request; and wherein the registration fee information deliverer of the server device, upon receiving a registration fee information delivery request from one of the game devices, transmits the registration fee information to the game device having transmitted the registration fee information delivery request.

12. The game system of claim 9, wherein each game device further comprises a delivery requester that generates, at the time of each game device being activated, a registration fee information delivery request requesting for delivery of the registration fee information, and that transmits to the server device the registration fee information delivery request; and wherein the registration fee information deliverer of the server device, upon receiving a registration fee information delivery request from one of the game devices, transmits the registration fee information to the game device having transmitted the registration fee information delivery request.

* * * * *